US00RE47486E

(19) United States
(12) Reissued Patent
Zhang et al.

(10) Patent Number: US RE47,486 E
(45) Date of Reissued Patent: *Jul. 2, 2019

(54) RESOURCE REMAPPING AND REGROUPING IN A WIRELESS COMMUNICATION SYSTEM

(71) Applicant: Samsung Electronics Co., Ltd., Suwon-si, Gyeonggi-do (KR)

(72) Inventors: Jianzhong Zhang, Plano, TX (US); Joonyoung Cho, Suwon-si (KR); Zhouyue Pi, Allen, TX (US); Juho Lee, Suwon-si (KR); Aris Papasakellariou, Houston, TX (US); Farooq Khan, Allen, TX (US)

(73) Assignee: Samsung Electronics Co., Ltd., Suwon-si (KR)

( * ) Notice: This patent is subject to a terminal disclaimer.

(21) Appl. No.: 14/261,197

(22) Filed: Apr. 24, 2014

Related U.S. Patent Documents

Reissue of:
(64) Patent No.: 8,681,766
Issued: Mar. 25, 2014
Appl. No.: 13/215,963
Filed: Aug. 23, 2011

U.S. Applications:
(63) Continuation of application No. 12/200,462, filed on Aug. 28, 2008, now Pat. No. 8,077,693.
(Continued)

(51) Int. Cl.
*H04W 72/04* (2009.01)
*H04L 5/00* (2006.01)
(Continued)

(52) U.S. Cl.
CPC ..... *H04L 5/0055* (2013.01); *H04L 1/0026* (2013.01); *H04L 1/0071* (2013.01);
(Continued)

(58) Field of Classification Search
CPC .... H04W 72/04; H04L 5/0055; H04L 5/0048; H04L 5/0057; H04L 5/0007;
(Continued)

(56) References Cited

U.S. PATENT DOCUMENTS 5,820,390 A 10/1998 Takamoto et al.
6,031,827 A 2/2000 Rikkinen et al.
(Continued)

FOREIGN PATENT DOCUMENTS

CN 1319288 10/2001
EP 1594235 11/2005
(Continued)

OTHER PUBLICATIONS

Notification of Reason for Rejection, dated Sep. 18, 2015, in connection with Japanese Patent Application No. 2014-065511, 11 pages.
(Continued)

*Primary Examiner* — Mark Sager

(57) ABSTRACT

Methods and apparatus for remapping and regrouping transmission resources in a wireless communication system. First, a set of new permutation algorithms based on Galois field operation is proposed. Then the proposed algorithms and the known Pruned Bit Reversal Ordering (PBRO) algorithm are applied to several of various resource mapping schemes, including slot or symbol level Orthogonal Cover (OC)/Cyclic Shift (CS) mapping, cell-specific slot-level and symbol-level CS hopping patterns, and subframe and slot level base sequence hopping patterns.

48 Claims, 3 Drawing Sheets

Related U.S. Application Data

(60) Provisional application No. 60/960,191, filed on Sep. 19, 2007, provisional application No. 60/960,497, filed on Oct. 1, 2007.

(51) Int. Cl.
*H04L 1/00* (2006.01)
*H04L 1/16* (2006.01)

(52) U.S. Cl.
CPC ..... *H04L 1/1607* (2013.01); *H04L 5/0007* (2013.01); *H04L 5/0014* (2013.01); *H04L 5/0037* (2013.01); *H04L 5/0048* (2013.01); *H04L 5/0057* (2013.01)

(58) Field of Classification Search
CPC ... H04L 5/0014; H04L 5/0037; H04L 1/0026; H04L 1/0071; H04L 1/1607
USPC ..... 370/203–211, 321–324, 326, 336–337, 370/345–348; 455/39, 62, 73, 561, 93, 455/103
See application file for complete search history.

(56) References Cited

U.S. PATENT DOCUMENTS

| | | | | |
|---|---|---|---|---|
| 6,157,611 | A | 12/2000 | Shanbhag | |
| 6,912,240 | B2 | 6/2005 | Kumar et al. | |
| 6,925,068 | B1 | 8/2005 | Stanwood et al. | |
| 7,075,945 | B2 | 7/2006 | Arsenault et al. | |
| 7,746,916 | B2 | 6/2010 | Han et al. | |
| 7,761,750 | B2 | 7/2010 | Eroz et al. | |
| 8,724,444 | B2 | 5/2014 | Ko et al. | |
| 2001/0019576 | A1 | 9/2001 | Nystrom et al. | |
| 2002/0154621 | A1 | 10/2002 | Laroia et al. | |
| 2003/0067943 | A1 | 4/2003 | Arsenault et al. | |
| 2004/0062193 | A1 | 4/2004 | Ma et al. | |
| 2005/0030931 | A1 | 2/2005 | Sung et al. | |
| 2005/0037754 | A1 | 2/2005 | Trachtman | |
| 2005/0037764 | A1 | 2/2005 | Trachtman | |
| 2005/0157670 | A1* | 7/2005 | Tang et al. | 370/320 |
| 2006/0209754 | A1 | 9/2006 | Ji et al. | |
| 2007/0171995 | A1 | 7/2007 | Muharemovic et al. | |
| 2007/0183386 | A1* | 8/2007 | Muharemovic et al. | 370/344 |
| 2008/0051125 | A1* | 2/2008 | Muharemovic et al. | 455/519 |
| 2008/0107192 | A1* | 5/2008 | Mukkavilli et al. | 375/260 |
| 2008/0310383 | A1 | 12/2008 | Kowalski | |
| 2008/0311942 | A1* | 12/2008 | Kim et al. | 455/509 |
| 2013/0286977 | A1 | 10/2013 | Kwon et al. | |

FOREIGN PATENT DOCUMENTS

| | | | |
|---|---|---|---|
| JP | 9097658 | | 4/1997 |
| JP | 2002523915 | | 7/2002 |
| JP | 2002523970 | | 7/2002 |
| JP | 3427056 | | 7/2003 |
| JP | 2010-525728 | | 7/2010 |
| JP | 2010536229 | A1 | 11/2010 |
| KR | 10-2002-0084517 | A | 11/2002 |
| KR | 10-2007-0053756 | A | 5/2007 |
| RU | 2005118847 | | 12/2006 |
| WO | WO 2001/076110 | | 10/2001 |
| WO | WO 2006/069826 | | 7/2006 |
| WO | WO 2007024109 | A1 * | 3/2007 |
| WO | WO 2007035302 | | 3/2007 |
| WO | WO 2008/132073 | A1 | 11/2008 |
| WO | WO 2008/153298 | A1 | 12/2008 |

OTHER PUBLICATIONS

3GPP TSG RAN WG1 Meeting #47bis, "Uplink control channel multiplexing", R1-070330, Jan. 15-19, 2007, Sorrento, Italy, 4 pages.
3GPP TSG RAN WG1 Meeting #49bis, "Cyclic Shift Hopping of UL ACK Channels", R1-073149, Jun. 25-29, 2007, Orlando, US, 6 pages.
3GPP TSG RAN WG1 Meeting #50, "Symbol based cyclic shift hopping", R1-073643, Aug. 20-24, 2007, Athens, Greece, 6 pages.
Notification of Reason for Rejection, dated Jul. 27, 2015, in connection with Japanese Patent Application No. 2014-110996, 38 pages.
3GPP TSG RAN WG1 #50, "Joint Coding of CQI and ACK", R1-073260, Aug. 20-24, 2007, Athens, Greece, 7 pages.
3GPP TSG RAN WG1 Meeting #50, "Code Allocation for UL ACK/NACK Channels", R1-073522, Aug. 20-24, 2007, Athens, Greece, 3 pages.
3GPP TSG RAN WG1 Meeting #50bis, "SLot-level UL ACK/NACK Cyclic Shift/Orthogonal Cover Remapping", R1-074092, Oct. 8-12, 2007, Shanghai, China, 6 pages.
Decision of Grant, dated Aug. 7, 2015, in connection with Korean Patent Application No. 10-2014-0040134, 7 pages.
Intl. Search Report of the International Searching Authority dated Mar. 23, 2009 in connection with Intl. Application No. PCT/KR2008/005569, filed Sep. 19, 2008.
Written Opinion of the International Searching Authority dated Mar. 23, 2009 in connection with International Application No. PCT/KR2008/005569, filed Sep. 19, 2008.
3GPP TSG RAN WG1 #50, "Chairman's Notes", Athens, Greece, Aug. 20-24, 2007.
3GPP TSG RAN WG1 Meeting #50, R1-073541, "UL ACK/NACK Channel Structure", Athens, Greece, Aug. 20-24, 2007.
3GPP TSG RAN WG1 Meeting #50, R1-073564, "Selection of Orthogonal Cover and Cyclic Shift for High Speed UL ACK Channels", Athens, Greece, Aug. 20-24, 2007.
3 GPP TSG RAN WG1 #49, R1-072225, "CCE to RE Mapping", Kobe, Japan, May 7-11, 2007.
3GPP TSG RAN WG1 Meeting #50, R1-073412, "Randomization of Intra-cell Interference in PUCCH", Athens, Greece, Aug. 20-24, 2007.
3GPP TSG RAN WG1 Meeting #50, R1-073413, "Sequence Allocation and Hopping for Uplink ACK/NAK Channels", Athens, Greece, Aug. 24-24, 2007.
3GPP TSG RAN WG1 Meeting #50, R1-073661, "Signaling of Implicit ACK/NACK Resources", Athens, Greece, Aug. 20-24, 2007.
3GPP TSG RAN WG1 Meeting #50, "S-SCH scrambling and mapping methods", Athens, Greece, Oct. 20-24, 2007, 10 pages.
3GPP TSG RAN WG1 Meeting #49bis, "Summary of Reflector Discussions on EUTRA UL RS", Orlando, FL, Jun. 25-29, 2007, 4 pages.
3GPP TSG RAN WG1 Meeting #50, "PUSCH and PUCCH hopping patterns", Athens, Greece, Aug. 20-24 2007, 4 pages.
3GPP TSG RAN WG1 Meeting #50, "Summary of Reflector Discussions on EUTRA DL RS", Athens, Greece, Aug. 20-24, 2007, 3 pages.
3GPP TSG RAN1#50; "E-UTRA Uplink Reference Signal Planning and Hopping Considerations", Athens, Greece, Aug. 20-24, 2007, 11 pages.
Translated Japanese Examination Report in connection with Japanese JP 2012-256144; dated Nov. 5, 2013; 8 pages.
Extended European Search Report dated Apr. 23, 2014 in connection with European Patent Application No. 14162731.5, 10 pages.
Translated Korean Office Action dated May 16, 2014 in connection with Korean Patent Application No. 10-2008-0092278, 7 pages.
3GPP TSG RAN WG1 Meeting #50; "Randomization of intra-cell interference in PUCCH"; R1-073412; Athens, Greece; Aug. 20-24, 2007; 6 pages.
3GPP TSG RAN WG1 Meeting #50; "Sequence allocation and hopping for uplink ACK/NAK channels"; R1-073413; Athens, Greece; Aug. 20-24, 2007; 6 pages.
3GPP TSG RAN WG1 Meeting #50; "Cell Specific Cyclic Shift Hopping v.s. UE specific Cyclic Shift Hopping for Uplink ACK/NACK Signals"; R1-073619; Athens, Greece; Aug. 20-24, 2007; 4 pages.

(56) References Cited

OTHER PUBLICATIONS

3GPP TSG RAN WG1 Meeting #50; "Cyclic shift and orthogonal cover allocations for UL ACK/NACK" R1-074094; Athens, Greece; Aug. 20-24, 2007; 5 pages.
3GPP TSG RAN WG1 Meeting #51; "Slot-level UL ACK/NACK Cyclic/Orthogonal Cover Remapping"; R1-074788; Jeju, Korea; Nov. 5-9, 2007; 6 pages.
3GPP TSG RAN WG1 Meeting #50; "Implicit ACK/NAK Multiplexing in PUCCH CQI Sub-Frame Structure"; R1-073577; Athens, Greece; Aug. 20-24, 2007; 5 pages.
Extended European Search Report dated Jul. 3, 2014 in connection with European Patent Application No. 08016543.4; 10 pages.
3GPP TSG RAN WG1 Meeting #52 "Slot-level UL ACK/NACK Cyclic Shift/Orthogonal Cover Remapping", Sorrento, Italy, Feb. 11-15, 2008, 6 pages.
3GPP TSG RAN WG1 Meeting #49bis; "Uplink Data-non-associated Control Signaling in E-UTRA"; R1-073072; Orlando, FL, U.S.; Jun. 25-29, 2007; 5 pages.
Translated Japanese Notification of Rejection of Application in connection with Japanese JP 2014-065511; dated Feb. 23, 2015; 7 pages.
Chinese Office Action issued for CN 201210511394.8 dated Feb. 14, 2016, 10 pgs.
Examination Report dated Aug. 10, 2016 in connection with Indian Application No. 1403/CHENP/2010, 8 pages.
Communication from a foreign patent office in a counterpart foreign application, European Patent Office, "Communication pursuant to Article 94(3) EPC," Application No. EP 08016543.4, Jul. 20, 2017, 9 pages.
Communication from a foreign patent office in a counterpart foreign application, European Patent Office, "Communication pursuant to Article 94(3) EPC," Application No. EP 14162731.5, Jul. 20, 2017, 9 pages.
Communication from a foreign patent office in a counterpart foreign application, European Patent Office, "European Search Report" Application No. EP 17165821.4, Jul. 21, 2017, 12 pages.
Nokia Siemens Networks, Nokia, "Cyclic Shift Hopping and DM RS Signaling," R1-073644, 3GPP TSG-RAN WG1 #50, Athens, Greece, Aug. 20-24, 2007, 4 pages.
Nokia Siemens Networks, Nokia, "Signaling of Implicit ACK/NACK resources," R1-073006, 3GPP TSG RAN WG1 #49bis, Orlando, USA, Jun. 25-29, 2007, 7 pages.
Qualcomm Europe, "PUSCH and PUCCH hopping patterns," R1-073264, 3GPP TSG-RAN WG1 #50, Athens, Greece, Aug. 20-24, 2007, 4 pages.
Toshiba, "CAZAC sequence for PUCCH," R1-073316, 3GPP TSG-RAN WG1 #50, Athens, Greece, Aug. 20-24, 2007, 3 pages.
3GPP TSG RAN WG1 Meeting #50, "CAZAC sequence for PUCCH", Athens, Greece, Aug. 20-24, 2007, 3 pages.

* cited by examiner

RESOURCE REMAPPING AND REGROUPING IN A WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

[This] *More than one reissue application as been filed on U.S. Pat. No. 8,681,766. The present* application *is a reissue of U.S. Pat. No. 8,681,766 issued Mar. 25, 2014 on U.S. patent application Ser. No. 13/215,963, filed Aug. 23, 2011 and entitled RESOURCE REMAPPING AND REGROUPING IN A WIRELESS COMMUNICATION SYSTEM, which* is a continuation of U.S. patent application Ser. No. 12/200,462, filed on Aug. 28, 2008, entitled "RESOURCE REMAPPING AND REGROUPING IN A WIRELESS COMMUNICATION SYSTEM," now U.S. Pat. No. 8,077,693, which claims priority to U.S. Provisional Patent Application No. 60/960,191 filed on Sep. 19, 2007, and U.S. Provisional Patent Application No. 60/960,497 filed on Oct. 1, 2007. [U.S. patent application Ser. No. 12/200,462 is assigned to the assignee of the present application and is incorporated by reference into this disclosure as if fully set forth herein. This disclosure hereby claims priority under 35 U.S.C. §120 to U.S. patent application Ser. No. 12/200,462. This application makes reference to, incorporates the same herein, and claims all benefits accruing under 35 U.S.C. § 119 from provisional applications earlier filed in the U.S. Patent & Trademark Office on 19 Sep. 2007 and there duly assigned Ser. No. 60/960,191, and on 1 Oct. 2007 and there duly assigned Ser. No. 60/960,497, respectively.] *U.S. patent application Ser. No. 15/040,930 filed Feb. 10, 2016 is also an application for reissue of U.S. Pat. No. 8,681,766 and is a continuation reissue of the present application.*

BACKGROUND OF THE INVENTION

1. Field of the Invention

The present invention relates to methods and apparatus for remapping and regrouping transmission resources in a wireless communication system.

2. Description of the Related Art

The present invention incorporates by reference the following references:

[1] 3GPP RAN1#50 Chairman's Notes, August 2007, Athens, Greece

[2] R1-073541, "UL ACK/NACK Structure, Samsung, RAN1#50, August 2007, Athens, Greece

[3] R1-073564, "Selection of Orthogonal Cover and Cyclic Shift for High Speed UL ACK Channels", Samsung, RAN1#50, August 2007, Athens, Greece

[4] R1-072225, "CCE to RE mapping", Samsung, RAN1#49, Kobe, May 2007

[5] R1-073412, "Randomization of intra-cell interference in PUCCH", ETRI, RAN1#50, Athens, August 2007

[6] R1-073413, "Sequence allocation and hopping for uplink ACK/NACK channels", ETRI, RAN1#50, Athens, August 2007

[7] R1-073661, "Signaling of implicit ACK/NACK resources", Nokia Siemens, Nokia, RAN1 #50, Athens, August 2007

Telecommunication enables transmission of data over a distance for the purpose of communication between a transmitter and a receiver. The data is usually carried by radio waves and is transmitted using a limited transmission resource. That is, radio waves are transmitted over a period of time using a limited frequency range.

In Third ($3^{rd}$) Generation Partnership Project Long Term Evolution (3GPP LTE) systems, one type of the transmission resource used in the uplink control channel (PUCCH) is known as a Cyclic shift (CS) for each OFDM symbol. For example, the PUCCH occupies twelve subcarriers in one resource block (RB) and therefore twelve CS resources in one RB.

In addition, according to the current working assumption on the transmission block of UL acknowledgement (ACK) channel and reference signal (RS), acknowledgement and negative acknowledgement (ACK/NAK) signals and the uplink (UL) RS for ACK/NACK demodulation are multiplexed on the code channels constructed by both a cyclic shift (CS) of a base sequence and an orthogonal cover (OC). One example of base sequence is Zadoff-Chu sequence.

One important aspect of system design is resource remapping on a symbol, slot or subframe-level. Although some methods have been proposed in the past such as the remapping table based approach disclosed in Reference [5], the remapping table based approach requires the storage of the remapping table and is therefore not desirable. We attempt to find an efficient yet general method for resource remapping in this invention.

SUMMARY OF THE INVENTION

It is therefore an object of the present invention to provide improved methods and apparatus for wireless communication.

It is another object of the present invention to provide improved methods and apparatus for efficiently remapping and regrouping transmission resources in a wireless communication system.

According to one aspect of the present invention, a global resource mapping scheme is established between N resource combinations in a first time slot and N resource combinations in a second time slot in dependence upon a certain parameter n. The mapping scheme is established by:

$$j=g(i,n),$$

where i denotes the index of a resource combination in the first time slot and i=1, 2, . . . , N, j denotes the index of a resource combination in the second time slot and j=1, 2, . . . , N, and g(a,b) is a pseudo-random function.

The pseudo-random function may be a Galois Field based permutation function established by:

$$j=g(i,n)=P_G(i,n,N),$$

where n is selected from a set of integers {1, 2, . . . , N}.

Alternatively, the pseudo-random function may be a Pruned Bit Reversal Ordering (PBRO) function established by:

$$j=g(i,n)=PRBO(mod(i+n-1,N)+1,N).$$

The parameter n may be the same for all cells in the communication network.

Alternatively, the parameter n may be assigned to each cell in the communication network in dependence upon an identification of the cell.

Each of the resource combinations includes an orthogonal cover selected from a plurality of orthogonal covers and a cyclic shift of a base sequence selected from a plurality of cyclic shifts. A cell-specific symbol level cyclic shift hopping pattern may be established to shift the index of the cyclic shift within at least one resource combination on a modulation symbol in a subframe in a cell by an amount specified by h_sym(c_id,s_id,l_id). The post-shifting index $v_i'$ of the cyclic shift having a pre-shifting index of $v_i$ within an i-th resource combination is established by:

$$v_i'=\text{cyclic_shift}(v_i,\text{h_sym}(c_id,s_id,l_id),K)$$

where c_id denotes the identification of the cell, s_id denotes the identification of the subframe, l_id denotes the identification of the modulation symbol, K denotes the total number of the plurality of cyclic shifts, and cyclic_shift(a,b,N)=mod(a+b−1,N)+1 when the plurality of cyclic shifts are indexed as 1, 2, . . . , N.

The function h_sym(c_id,s_id,l_id) may be one of a Galois Field based permutation function established by:

$$\text{h_sym}(c_id,s_id,l_id)=P_G(x(l_id,K),r(c_id,n,K),$$

and a Pruned Bit Reversal Ordering (PBRO) function established by:

$$\text{h_sym}(c_id,s_id,l_id)=\text{PBRO}(\text{mod}(l_id+c_id+n-1,K)+1,K),$$

where x(l_id,K)=mod(l_id−1,K)+1, and r(c_id,n,K)=mod(c_id+n−1,K)+1.

Alternatively, a cell-specific slot-level cyclic shift hopping pattern may be established to shift the index of the cyclic shift within at least one resource combination in a time slot in a cell by an amount specified by h_slot(c_id, sl_id). The post-shifting index $v_i'$ of the cyclic shift having a pre-shifting index of $v_i$ within an i-th resource combination is established by:

$$v_i'=\text{cyclic_shift}(v_i,\text{h_slot}(c_id,\ sl_id),K)$$

where c_id denotes the identification of the cell, sl_id denotes the identification of the time slot, K denotes the total number of the plurality of cyclic shifts, and cyclic_shift(a,b,N)=mod(a+b−1,N)+1 when the plurality of cyclic shifts are indexed as 1, 2, . . . , N. The function h_slot(c_id,sl_id) may be one of a Galois Field based permutation function established by:

$$\text{h_slot}(c_id,sl_id)=P_G(sl_id,\ r(c_id,n,K),K),$$

and a Pruned Bit Reversal Ordering (PBRO) function established by:

$$\text{h_slot}(c_id,sl_id)=\text{PBRO}(\text{mod}(sl_id+c_id+n-1,K)+1,K),$$

where r(c_id,n,K)=mod(c_id+n−1,K)+1.

According to another aspect of the present invention, first, N resource combinations within each of a plurality of time slots are divided into K subsets, with a k-th subset including $N_k$ resource combinations, where k=1, 2, . . . , K. An intra-subset resource mapping scheme is established between the resource combinations in the subsets in a first time slot and the resource combinations in the subsets in a second time slot in dependent upon a certain parameter vector $\overline{n}=[n_1, n_2, \ldots, n_K]$, where $n_k$ corresponds to a k-th subset. The mapping scheme is established by:

$$i_{k,d}=g(i,\overline{n})=g_k(i_{k,c},n_k),\ \text{for } k=1, 2, \ldots, K$$

where $i=i_{k,c}$, $i_{k,c}$ denotes the index of a resource combination within the N resource combinations in the first time slot, k denotes the index of the subset where the $i_{k,c}$-th resource combination is located, c denotes the index of the $i_k$-th resource combination within the k-th subset, $i_{k,d}$ denotes the index of a resource combination within the N resource combinations in the second time slot, k denotes the index of the subset where the $i_{k,d}$-th resource combination is located, d denotes the index of the $i_{k,d}$-th resource combination within the k-th subset, $i_{k,c}=(k-1)\times N_k+c$, $i_{k,d}=(k-1)\times N_k+d$, and g(a,b) is a pseudo-random function.

According to yet another aspect of the present invention, first, N resource combinations within each of a plurality of time slots are divided into K subsets, with a k-th subset including $N_k$ resource combinations, where k=1, 2, . . . , K, and $N_1=N_2=\ldots=N_K$. An inter-subset interleaving scheme is established in at least one time slot in accordance with an interleaving parameter $PG[s_1, s_2, \ldots, s_K]$. The inter-subset interleaving scheme is established by:

$$j=w(i,PG[s_1,s_2, \ldots, s_K]),\ \text{for } k=1, 2, \ldots, K,$$

where $w(i,PG[s_1, s_2, \ldots, s_K])$ denotes the i-th resource combination in the time slot after the interleaving in accordance with the interleaving parameter $PG[s_1, s_2, \ldots, s_K]$, and the interleaving parameter $PG[s_1, s_2, \ldots, s_K]$ indicates that a subset having a pre-interleaving index of $s_k$ has a post-interleaving index of k, and $1\le s_1, \ldots, s_K\le K$.

According to still another aspect of the present invention, a symbol-level cyclic shift mapping scheme is established between M cyclic shifts in a first modulation symbol in a transmission channel and M cyclic shifts in a second modulation symbol in the transmission channel in dependence upon a certain parameter n. The first modulation symbol has an identification number of 1, and the second modulation symbol has an identification number of more than 1. The symbol-level cyclic shift mapping scheme is established by:

$$m'=t(m,l_id,\ n),\ \text{for } l_id>1,$$

where m denotes the index of a cyclic shift within the first modulation symbol and m=1, 2, . . . , M, m' denotes the index of a cyclic shift within the second modulation symbol and m'=1, 2, . . . , M, l_id denotes the identification number the second modulation symbol, and t(a, b, c) is a pseudo-random function.

According to still yet another aspect of the present invention, a slot-level cyclic shift mapping scheme is established between M cyclic shifts in a first time slot in a transmission channel and M cyclic shifts in a second time slot in the transmission channel in dependence upon a certain parameter n. The slot-level cyclic shift mapping scheme is established by:

$$m'=g(m,n),$$

where m denotes the index of a cyclic shift within the first time slot and m=1, 2, . . . , M, m' denotes the index of a cyclic shift within the second time slot and m'=1, 2, . . . , M, and g(a,b) is a pseudo-random function.

According to a further aspect of the present invention, a subframe-level base sequence mapping scheme is established between Z base sequences in a first subframe in a transmission channel and Z base sequences in a second subframe in the transmission channel in dependence upon a certain parameter n. The first subframe has an identification number of 1, and the second subframe has an identification number of more than 1. The subframe-level base sequence mapping scheme is established by:

$$z'=s(z,\ s_id,\ n),\ \text{for } s_id>1,$$

where z denotes the index of a base sequence within the first subframe and z=1, 2, . . . , Z, z' denotes the index of a base sequence within the second subframe and z'=1, 2, . . . , Z, s_id denotes the identification number the second subframe, and s(a, b, c) is a pseudo-random function.

According to a still further aspect of the present invention, a slot-level base sequence mapping scheme is established between Z base sequences in a first time slot and Z base sequences in a second time slot 1 in dependence upon a certain parameter n. The first time slot has an identification number of 1, and the second time slot has an identification number of more than 1. The slot-level base sequence mapping scheme is established by:

$$z'=s(z, sl_id, n), \text{ for } sl_id>1,$$

where z denotes the index of a base sequence within the first time slot and z=1, 2, . . . , Z, z' denotes the index of a base sequence within the second time slot and z'=1, 2, . . . , Z, sl_id denotes the identification number the second time slot, and s(a,b,c) is a pseudo-random function.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
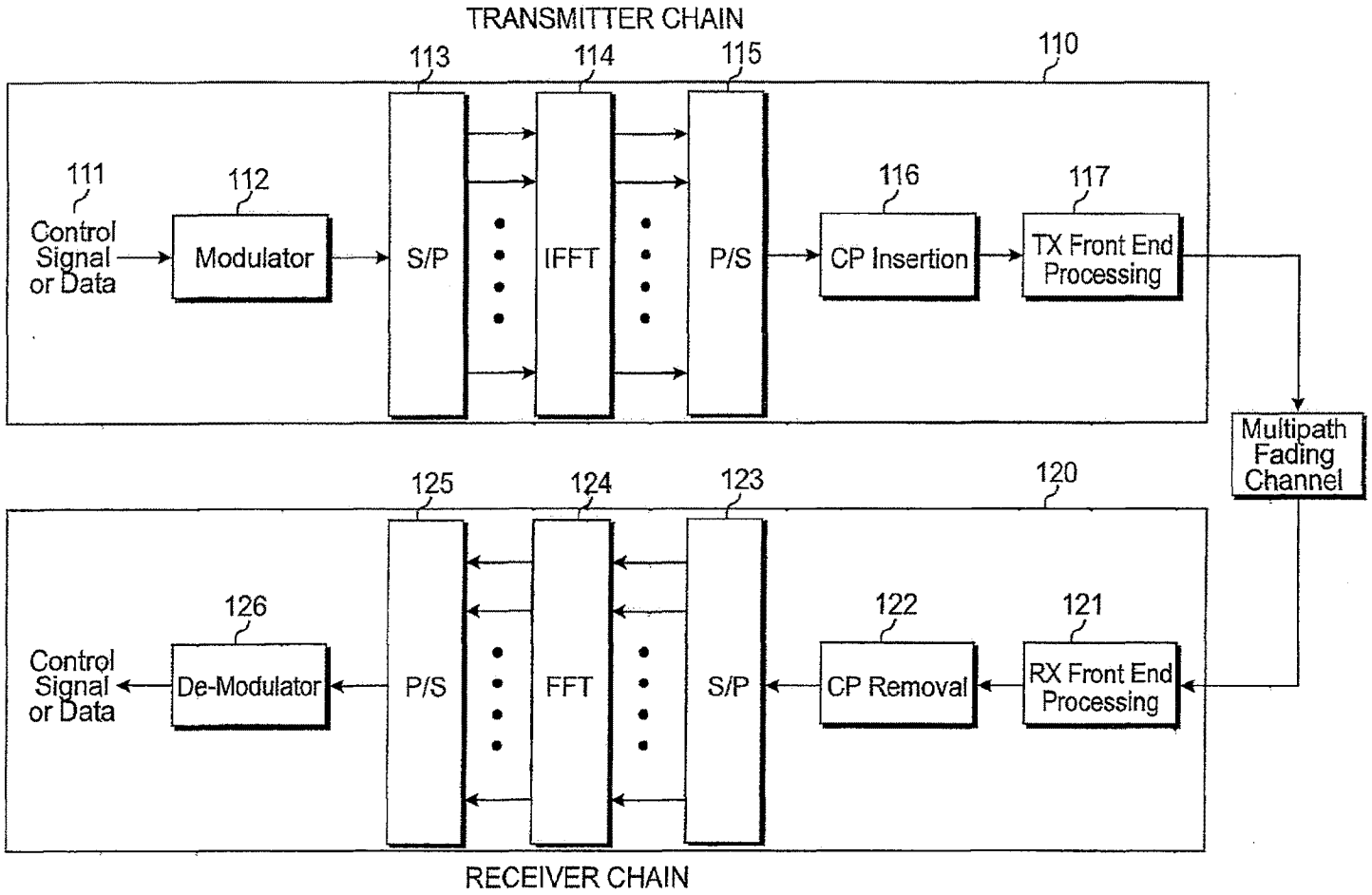
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulation symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transfinni (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
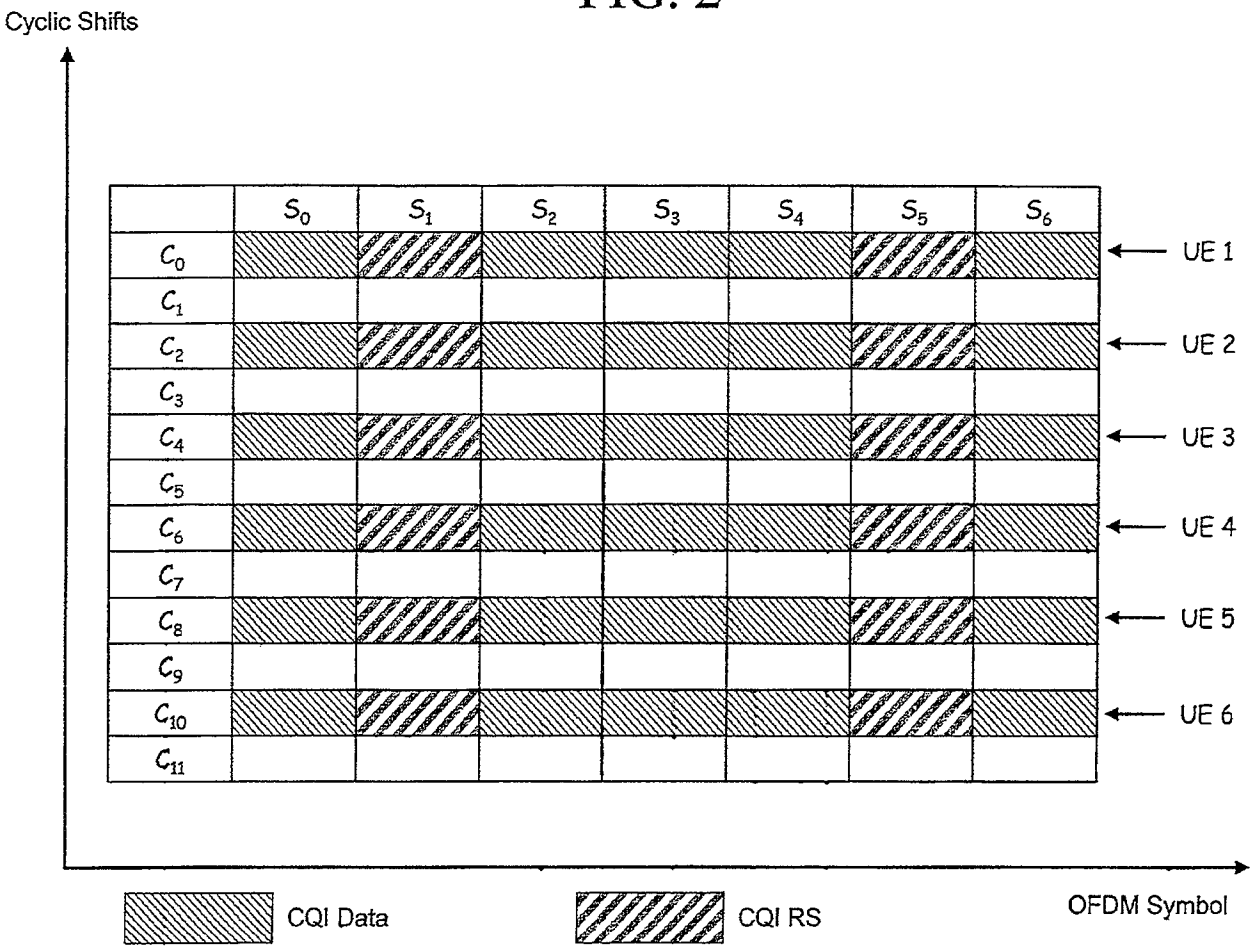
FIG. 2 schematically illustrates an example of multiplexing six units of user equipments (UEs) within one resource block (RB)

On the uplink (UL) of the Third Generation Partnership Project (3GPP) long term evolution (LTE) standard, one type of the resource used in the uplink control channel (PUCCH) is known as a Cyclic shift (CS) for each OFDM symbol. For example, the PUCCH occupies twelve subcarriers in one resource block (RB) and therefore we have twelve CS resources in one RB. One example of multiplexing six units of user equipment (UEs) in one RB is shown in FIG. 2. Note that only six out twelve CSs are used in this example.

Figure 3:
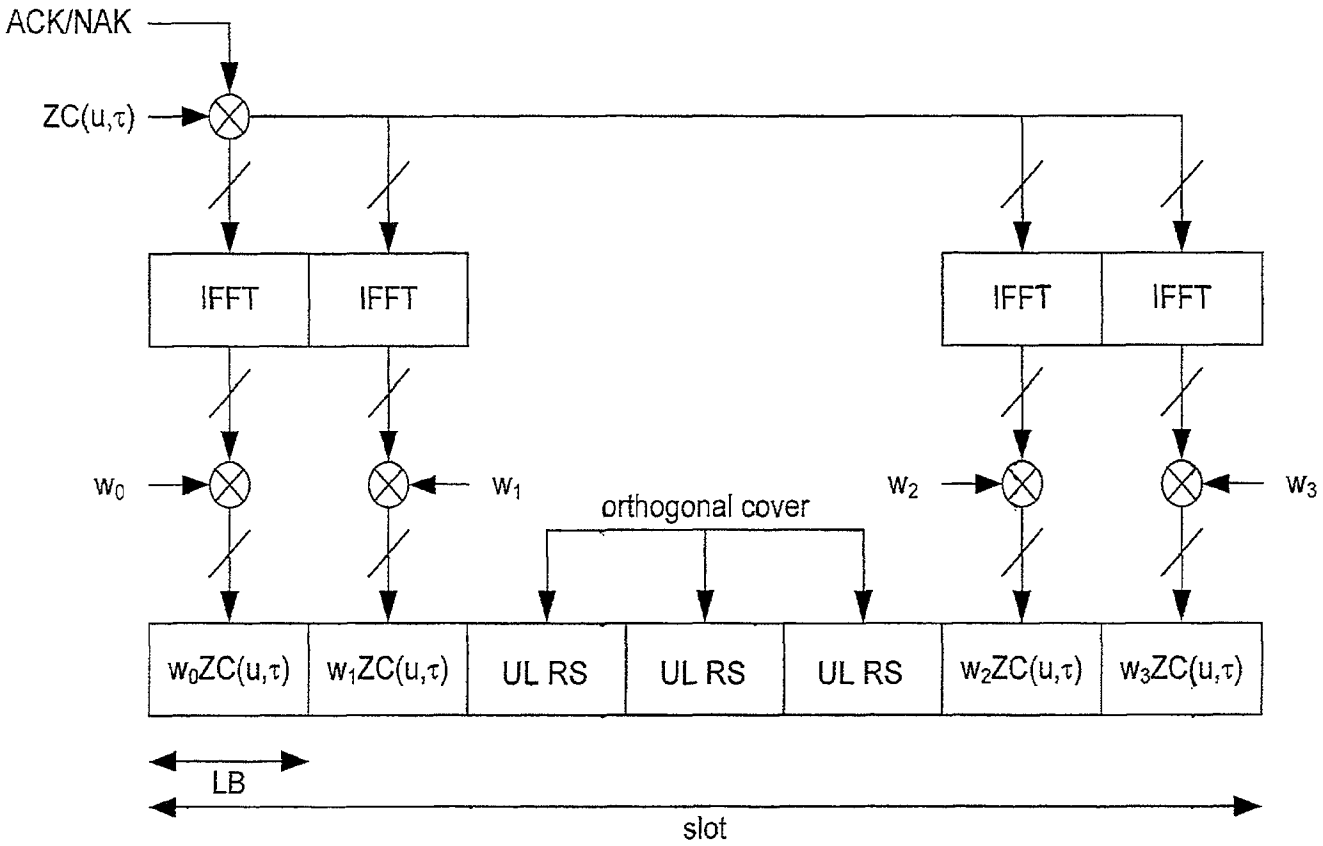
FIG. 3 schematically illustrates the current working assumption on the uplink acknowledgement and reference signal channels.

FIG. 3 illustrates the current working assumption on the transmission block of UL acknowledgement (ACK) channel and reference signal (RS). ACK/NAK signals and the UL RS for ACK/NACK demodulation are multiplexed on the code channels constructed by both a cyclic shift (CS) of a base sequence and an orthogonal cover (OC). One example of base sequence is Zadoff-Chu sequence.

One important aspect of system design is resource remapping on a symbol, slot or subframe-level. Although some methods have been proposed in the past such as the remapping table based approach disclosed in Reference [5], the remapping table based approach requires the storage of the remapping table and is therefore not desirable. We attempt to find an efficient yet general method for resource remapping in this invention.

In this invention, we first propose a set of new permutation algorithms, then propose to apply these algorithms and the known Pruned Bit Reversal Ordering (PBRO) algorithm, to several various resource remapping/regrouping problems, including slot or symbol level Orthogonal Cover (OC)/Cyclic Shift (CS) remapping, generation of cell-specific slot and symbol-level CS hopping patterns, and generation of subframe and slot level base sequence hopping patterns.

In addition, we note that the Pruned Bit Reversal Ordering (PBRO, or some times known as PBRI with "I" stands for interleaving) is a known method and has been used in many applications, for example, CCE to resource element (RE) mapping disclosed in Reference [4]. The PBRO method generates a permutation y=PBRO(i, M) of a sequence of {1, 2, . . . , M} of size M where y is the output value corresponding to the input value i. The PBRO is defined as follows:

1. Let i=i−1 such that i belongs to the sequence {0, 1, . . . , M−1}. Determine the PBRO parameter, n, where n is the smallest integer such that $M \le 2^n$.
2. Initialize counters i and j to 0.
3. Define x as the bit-reversed value of j using an n-bit binary representation. For example, if n=4 and j=3, then x=12.
4. If x<M, set PBRO(i,M) to x and increase i by 1.
5. Increment the counter j.
6. If i<M go to step 3. Other wise go to steo 7.
7. Let j=j+1, such that j belong to the set {1, 2, . . . M}.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

1. Proposed Permutation Algorithm

In a first embodiment according to the principles of the present invention, we propose a resource permutation function that is based on Galois field operations. Let N be the total number of resources being permuted, the operation of permutation function is given by:

$$j=P_G(i,n,N) \tag{1}$$

where i=1, . . . , N is the index of the input resource index, j=1, . . . , N is the output resource index, and n=1, . . . , N is the permutation sequence index, since a different n provides a different permuted output.

We first consider a case where N is an integer that satisfies $N=p^m-1$, where p is a prime number and m is a positive integer. In this case, Galois field N+1 exists and we denote it by GF(N+1). In addition, we can find a primitive element of this Galois field and call the primitive element a which satisfies $\alpha^N=\alpha^{p^m-1=1}$, and α is an integer. In addition, all N non-zero elements in the GF(N+1) can be expressed as an exponent of α, or in another word, the sequence $\alpha^0$, $\alpha^1$, . . . , $\alpha^{N-1}$ includes all N non-zero elements in GF(N+1). Therefore, any input resource number i can be expressed as a power of the primitive element $i=\alpha^k$ for some integer k such that $0\le k\le N-1$. With this notation, the output of the resource permutation function $P_G(i,n,N)$ is given by:

$$j=P_{G,1}(i,n,N)=\alpha^{mod(k+n-1,N)}, \text{ for } i=1, \ldots, N, \text{ and } n=1, \ldots, N, \tag{2}$$

where mod(a,b) is the modular operation applied on the two integers a and b. Another similar permutation function can be found as:

$$j=P_{G,2}(i,n,N)=\alpha^{mod(k-(n-1),N)}, \text{ for } i=1, \ldots, N, \text{ and } n=1, \ldots, N \tag{3}$$

Note that we can resort to finite field calculation to find out the natural number representation of j in the above equation.

On the other hand, we consider the special case where N is an integer that satisfies $N=p^1-1$, where p is a prime number. In this case, Galois field N+1, i.e., GF(N+1), also exists and is also a ground Galois field. In this, we propose a simpler approach of finding the output permuted resource:

$$j=P_{G,3}(i,n,N)=mod(i\times n,N+1), \text{ for } i=1, \ldots, N, \text{ and } n=1, \ldots, N. \tag{4}$$

Furthermore, if N does not satisfy $N=p^m-1$, for some prime number p and positive integer m, then we propose the following Pruned GF field based approach which we denote by $P_{G,4a}(i,n,N)$:

Step 1: Find the smallest integer M>N such that M satisfies $M=p^m-1$ where p is a prime number and m is positive. Form Galois field GF(M+1), find the primitive element α of GF(M+1). Set variables u=1, and v=1.

Step 2: Find w in such a way: if $M=p^m-1$ where p is prime and m>1, then w can be generated by either w $P_{G,1}(n,n,M)$ or $w=P_{G,2}(v,n,M)$; if M=p−1 where p is prime, then w can generated by one of the three functions above: $w=w=P_{G,2}(v,n,M)$ and $w=P_{G,3}(v,n,M)$.

Step 3: if w>N, let v=v+1, go to Step 2; else go to Step 4

Step 4: if u=i, go to Step 5; otherwise let u=u+1, v=v+1 and go to Step 2.

Step 5: We have obtained the output resource index $j=w=P_{G,4a}(i,n,N)$.

We also propose a similar method for the case where N does not satisfy N=p−1, for some prime number p, then we propose the following Pruned Ground GF field based approach which we denote by $P_{G,4b}(i,n,N)$:

Step 1: Find the smallest M>N such that M satisfies M=p−1 where p is a prime number. Set variables u=1, and v=1.

Step 2: Find w by $w=P_{G,3}(v,n,M)$.

Step 3: if w>N, let v=v+1, go to Step 2; else go to Step 4.

Step 4: if u=i, go to Step 5; otherwise let u=u+1, v=v+1 and go to Step 2.

Step 5: We have obtained the output resource index= $P_{G,4b}(i,n,N)$.

Let us now summarize the proposed permutation function. Therefore, for a set of inputs i, n, N, where $1\le i\le N$ and $1\le n\le N$, the permutation output is given by the function:

$$j = P_G(i, n, N) = \begin{cases} P_{G,1}(i, n, N) \text{ or } P_{G,2}(i, n, N) \text{ or } P_{G,3}(i, n, N), & \text{if } N = p - 1 \text{ for some prime number } p \\ P_{G,1}(i, n, N) \text{ or } P_{G,2}(i, n, N) \text{ or } P_{G,4b}(i, n, N), & \text{if } N = p^m - 1 \text{ for some prime number } p, \text{ and } m > 1 \\ P_{G,4a}(i, n, N), \text{ or } P_{G,4b}(i, n, N) & \text{if } N \text{ can not be expressed as } N = p^m - 1, p \text{ is prime and } m >= 1 \end{cases} \tag{5}$$

Noteworthy, in the above methods, we have assumed input and output resources are indexed as i=1, . . . , N, and j=1, . . . , N. If the input index i' and output j' are indexed as i'=0, . . . , N−1 and j'=0, . . . , N−1 instead, then the above equation should be used in the following way:

$$j'=P_G(i'+1, n,N)-1; \text{ for } i'=0, \ldots, N-1, j'=0, \ldots, N-1, \text{ and } n=1, \ldots, N. \tag{6}$$

2. Slot-Level Resource Remapping for Orthogonal Cover/Cyclic Shift Combinations

We first consider the case where there are a total of N resources available in each of the two slots in the uplink control channel, and each resource is defined as a combination of orthogonal cover and cyclic shift (OC/CS combo). An example of the application of this type of resource combo assignment is the uplink ACK/NACK channel. Note that the uplink service grant request channel may reuse the structure of uplink ACK/NACK channel. Another example of application of this type of resource combo assignment is the uplink demodulation reference symbols (RS).

One example of Orthogonal cover is Walsh-Hadmard code.

On the other hand, cyclic shift (CS) is typically applied on a base sequence, examples of base sequences include ZC (Zadoff-Zhu) code and computer generated CAZAC codes. For any base sequence of length N, there are N cyclic shifts, or N CS resources.

Let us start off by denote the OC/CS combo as CB hereafter. The N resource combos are given by:

$$CB_a[i]=\langle OC_a[u_i],CS_a[v_i]\rangle, \text{ for } i=1, \ldots, N, \text{ and } a=1, 2, \tag{7}$$

where $u_i$ and $v_i$ indicate the OC and CS indices for the ith resource combo, respectively. In addition, a=1, 2 is the slot index within a subframe for the 3GPP LTE uplink transmission.

2.1 Global Resource Remapping

In a second embodiment according to the principles of the present invention, let there be N OC/CS resource combos in both slots of an uplink subframe. We propose to associate the OC/CS resource combos in such a way that if a UE picks the resource combo CAN in the first slot, then the UE must be assigned $CB_2[g(i,n)]$ in the second slot, where g(i,n) is a pseudo-random resource remapping/permutation function, and n is a parameter.

In a first sub-embodiment of the second embodiment according to the principles of the present invention, the pseudo-random permutation function is established as:

$$g(i,n)=P_G(i,n,N), \tag{8}$$

where n is chosen from the set {1, 2, . . . , N}, or n=1, . . . , N. The function $P_G(i,n,N)$ is defined in the previous section.

In a second sub-embodiment of the second embodiment according to the principles of the present invention, the pseudo-random permutation function uses the PBRO function in such a way:

$$g(i,n)=PBRO(mod(i+n-1,N)+1,N) \tag{9}$$

The function PBRO(a,b) is defined previously, and n is chosen from the set {1, 2, . . . , N}.

In a third sub-embodiment of the second embodiment according to the principles of the present invention, the parameter n in the above two sub-embodiments is the same for all cells. The parameter n can be communicated to the UE by means of higher-layer signaling.

In a fourth sub-embodiment of the second embodiment according to the principles of the present invention, the parameter n is a function of CELL ID (c_id), denoted by n=f(c_id). Therefore, for a different c_id, we will have a different parameter n. One example of such a function is n=mod(c_id−1,N)+1.

Before we show an example for these above embodiments, we provide a table of four OC subsets $S_1$, $S_2$, $S_3$ and $S_4$ as is disclosed in Reference [3]. The three codes in each subsets are denoted as $S_i(A)$, $S_i(B)$, and $S_i(C)$.

TABLE 1

Equivalent mapping between all sets of three OCs.

| Four subsets | A | B | C |
|---|---|---|---|
| $S_1$ | c2 | c3 | c1 |
| $S_2$ | c1 | c4 | c2 |
| $S_3$ | c4 | c1 | c3 |
| $S_4$ | c3 | c2 | c4 |

where the set of OC codes are given by Walsh codes according to Reference [3]:

$$c1=0.5\times[1, 1, 1, 1];$$

$$c2=0.5\times[1, -1, 1, -1];$$

$$c3=0.5\times[1, 1, -1, -1];$$

$$c4=0.5\times[1, -1, -1,1]. \tag{10}$$

We now proceed with one example application of the embodiments. First, the allocation/definition of resource OC/CS combos are given in the Table 2 with N=18, as presented in Reference [3].

TABLE 2

OC/CS Resource Combinations defined on two slots, N = 18.

| Cyclic shift | Resource Combos in slot #1 - $CB_1[\ ]$ | | | Resource Combos in Slot #2 - $CB_2[\ ]$ | | |
|---|---|---|---|---|---|---|
| value | $OC_1[1]$ | $OC_1[2]$ | $OC_1[3]$ | $OC_2[1]$ | $OC_2[2]$ | $OC_2[3]$ |
| 0 | $CB_1[1]$ | | [13] | $CB_2[1]$ | | [13] |
| 1 | | [7] | | | [7] | |
| 2 | [2] | | [14] | [2] | | [14] |
| 3 | | [8] | | | [8] | |
| 4 | [3] | | [15] | [3] | | [15] |
| 5 | | [9] | | | [9] | |
| 6 | [4] | | [16] | [4] | | [16] |
| 7 | | [10] | | | [10] | |
| 8 | [5] | | [17] | [5] | | [17] |
| 9 | | [11] | | | [11] | |
| 10 | [6] | | [18] | [6] | | [18] |
| 11 | | [12] | | | [12] | |

Note here $OC_1[1]$, $OC_1[2]$, $OC_1[3]$ are the three OC codes used in slot 1, and $OC_2[1]$, $OC_2[2]$, $OC_2[3]$ are the three OC codes used in slot 2. In general, the OC codes in each slot can be an arbitrary subset of the four length-4 Walsh codes {c1, c2, c3, c4} defined in Table 1. One example of the OC codes selection is such that the OC codes in the first slot is given by $OC_1[1]=S_i(A)$, $OC_1[2]=S_i(C)$, $OC_1[3]=S_i(B)$, and the OC codes in the second slot is given by $OC_2[1]=S_j(A)$, $OC_2[2]=S_i(C)$, $OC_2[3]=S_j(B)$ for a pair of integers (i, j) (Reference [3]). For example, if i=j=2, then we have $OC_1[1]=OC_2[1]=S_2(A)=c1$; $OC_1[2]=OC_2[2]=S_2(C)=c2$; and $OC_1[3]=OC_2[3]=S_2(B)=c4$.

We now find the association/remapping between the resource combos in slot 1 and slot 2 in this example of 18 OC/CS combos in Table 2. Note the same association/remapping is applicable to any other case where there are N=18 OC/CS combinations, such as the alternative allocation scheme shown in Table 18 in the Annex. Since N=18 and N+1=19 is a prime number and GF(19) is a ground Galois field, we can use $g(i,n)=P_{G,3}(i,n,18)=mod(i\times n,19)$ as the permutation function g(i,n) that associates the slot 1 resource $CB_1[i]$ and slot 2 resource $CB_2[g(i,n)]$. This resource remapping function is shown in Table 3 below. Note that only n=1 to n=4 are shown, other parameter values n=5 to n=18 can also be used in generating the function g(i,n).

TABLE 3

Resource permutation/remapping function g(i, n) as a function of parameter n. N = 18.

| i | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| g(i, n), n = 1 | 1 | 2 | 3 | 4 | 5 | 6 | 7 | 8 | 9 | 10 | 11 | 12 | 13 | 14 | 15 | 16 | 17 | 18 |
| g(i, n), n = 2 | 2 | 4 | 6 | 8 | 10 | 12 | 14 | 16 | 18 | 1 | 3 | 5 | 7 | 9 | 11 | 13 | 15 | 17 |

TABLE 3-continued

| Resource permutation/remapping function g(i, n) as a function of parameter n. N = 18. | | | | | | | | | | | | | | | | | | |
|---|---|---|---|---|---|---|---|---|---|---|---|---|---|---|---|---|---|---|
| i | 1 | 2 | 3 | 4 | 5 | 6 | 7 | 8 | 9 | 10 | 11 | 12 | 13 | 14 | 15 | 16 | 17 | 18 |
| g(i, n), n = 3 | 3 | 6 | 9 | 12 | 15 | 18 | 2 | 5 | 8 | 11 | 14 | 17 | 1 | 4 | 7 | 10 | 13 | 16 |
| g(i, u), n = 4 | 4 | 8 | 12 | 16 | 1 | 5 | 9 | 13 | 17 | 2 | 6 | 10 | 14 | 18 | 3 | 7 | 11 | 15 |

In another example, we have N=12, or 12 OC/CS resource combos in each slot, as shown in Table 4 below.

TABLE 4

| OC/CS Resource Combinations defined on two slots, presented in Reference [3]. N = 12. | | | | | | |
|---|---|---|---|---|---|---|
| Cyclic shift | Resource Combos in slot #1 - $CB_1[\ ]$ | | | Resource Combos in Slot #2 - $CB_2[\ ]$ | | |
| value | $OC_1[1]$ | $OC_1[2]$ | $OC_1[3]$ | $OC_2[1]$ | $OC_2[2]$ | $OC_2[3]$ |
| 0 | $CB_1[1]$ | | | $CB_2[1]$ | | |
| 1 | | [5] | | | [5] | |
| 2 | | | [9] | | | [9] |
| 3 | [2] | | | [2] | | |
| 4 | | [6] | | | [6] | |
| 5 | | | [10] | | | [10] |
| 6 | [3] | | | [3] | | |
| 7 | | [7] | | | [7] | |
| 8 | | | [11] | | | [11] |
| 9 | [4] | | | [4] | | |
| 10 | | [8] | | | [8] | |
| 11 | | | [12] | | | [12] |

We now find the association between the resource combos in slot 1 and slot 2 in this example of Table 4. Note the same association/remapping is applicable to any other case where there are N=12 OC/CS combinations, Since N=12 and N+1=13 is a prime number and GF(13) is a ground Galois field, we can use $g(i,n)=P_{G,3}(i,n,12)=\mathrm{mod}(i\times n,13)$ as the permutation function g(i,n) that associates the slot 1 resource $CB_1[i]$ and slot 2 resource $CB_2[g(i,n)]$. This resource remapping function is shown in Table 5 below. Note that only n=1 to n=3 are shown, other parameter values n=5 to n=12 can also be used in generate the function g(i,n).

TABLE 5

| Resource permutation/remapping function g(i, n) as a function of parameter n. N = 12 | | | | | | | | | | | | |
|---|---|---|---|---|---|---|---|---|---|---|---|---|
| i | 1 | 2 | 3 | 4 | 5 | 6 | 7 | 8 | 9 | 10 | 11 | 12 |
| g(i, n), n = 1 | 1 | 2 | 3 | 4 | 5 | 6 | 7 | 8 | 9 | 10 | 11 | 12 |
| g(i, n), n = 2 | 2 | 4 | 6 | 8 | 10 | 12 | 1 | 3 | 5 | 7 | 9 | 11 |
| g(i, n), n = 3 | 3 | 6 | 9 | 12 | 2 | 5 | 8 | 11 | 1 | 4 | 7 | 10 |

In a third embodiment according to the principles of the present invention, we propose to assign the subset $S_i$ and $S_j$ to slot 1 and 2 in a subframe, for all UEs within a give cell. In addition, we propose to associate the indices of subsets, i and j, with the CELL ID, denoted by c_id. One example of this association is:

$$i=\mathrm{mod}(c_id-1,4)+1,\ \text{and}\ j=\mathrm{mod}(i+n-1,4)+1 \tag{11}$$

where n is a positive integer. Once the indices i and j are available, for this cell whose CELL ID is c_id, we let:

$$OC_1[1]=S_i(A),\ OC_1[2]=S_i(C),\ OC_1[3]=S_i(B), \tag{12}$$

for the first slot, and let:

$$OC_2[1]=S_j(A),\ OC_2[2]=S_j(C),\ OC_2[3]=S_j(B) \tag{13}$$

for the second slot.

Note that this embodiment applies to, for example, both N=18 and N=12 examples shown in Table 2 and Table 4 above.

2.2 Intra-Subset Resource Remapping

In a fourth embodiment according to the principles of the present invention, we propose to divide the N resources into K subsets, with a k-th subset having $N_k$ elements (k=1, 2, . . . , K), such that $$\sum_{k=1}^{K} N_k = N.$$

Furthermore, the subsets in slot#1 and slot #2 have the same indices. The formation of these subsets is shown in Table 6 below.

TABLE 6

| Dividing the N OC/CS resource combos into subsets. | | |
|---|---|---|
| | Resources Combos in Slot #1 | Resources Combos in Slot #2 |
| Subset 1 | $\{CB_1[i_{1,1}], \ldots, CB1[i_{1,N_1}]\}$ | $\{CB2[i_{1,1}], \ldots, CB2[i_{1,N_1}]\}$ |
| Subset 2 | $\{CB_1[i_{2,1}], \ldots, CB1[i_{2,N_2}]\}$ | $\{CB2[i_{2,1}], \ldots, CB2[i_{2,N_2}]\}$ |
| . . . | . . . | . . . |
| subset K | $\{CB_1[i_{K,1}], \ldots, CB1[i_{K,N_K}]\}$ | $\{CB2\ [i_{K,1}], \ldots, CB2[i_{K,N_k}]\}$ |

Furthermore, we propose to associate the OC/CS resource combos in such a way that a resource combo in subset #k, slot #1 have to permute to a resource combo in subset #k, slot #2. If a UE picks the resource combo $CB_1[i_{k,c}]$ in the first slot ($1\le c\le N_k$) that belongs to subset #k within slot #1, then the UE must be assigned $CB_2[g_k(i_{k,c},n_k)]$ in the second slot, where $g_k(i_{k,c},n_k)$ is a pseudo-random resource remapping/permutation function for subset #k, and $n_k$ is a parameter for subset #k. Note that $i_{k,c}=(k-1)\times N_k+c$. Furthermore, $CB_2[g_k(i_{k,c},n_k)]$ also must be a part of the subset #k within slot #2, such that $g_k(i_{k,c},n_k)=i_{k,d}$ holds for some $1\le d\le N_k$. We proceed to show how to derive output resource index $i_{k,d}$ for each input index $i_{k,c}$ (derive variable d from variable c). Note that $i_{k,d}=(k-1)\times N_k+d$.

In a first sub-embodiment of the fourth embodiment according to the principles of the present invention, the resource remapping/permutation within each subset uses the Galois Field based permutation function proposed earlier in Section 1. In each subset k, we associate/remap the two resources CA $[i_{k,c}]$ and $CB_2[g_k(i_{k,c},n_k)]$ according to:

$$g_k(i_{k,c},n_k)=i_{k,d},\ \text{where}\ d=P_G(c,n_k,N_k)\ \text{for}\ k=1,\ldots,K. \tag{14}$$

Note that here $n_k$ is a parameter for subset k such that $1\le n_k\le N_k$. We can further collect all these parameters into a vector form $n=[n_1, \ldots, n_K]$, the total number of possible parameter vectors is the product $N_1 \times N_2 \times \ldots \times N_K$. Furthermore, summarizing the resource remapping in all subsets, then for each parameter vector n, we have defined the overall remapping function over the whole resource set, which we denote as g(i,n) and provide association/remapping between any resource $CB_1[i]$ in slot #1, and resource $CB_2[g(i,n)]$. The function g(i,n) is defined by first finding the subset k where i belongs, that is, by finding a subset where there is some c, such that $i=i_{k,c}$, furthermore, $$g(i,n)=g_k(i_{k,c},n_k), \text{ for the k, c such that } i=i_{k,c}. \quad (15)$$

In a second sub-embodiment of the fourth embodiment according to the principles of the present invention, the pseudo-random permutation function uses the PBRO function in such a way:

$$g(i_{k,c},n_k)=i_{k,d}, \text{ where } d=PBRO(mod(c+n_k-1)+1,N_k). \quad (16)$$

The function PBRO(a,b) is defined in the introduction, and $n_k$ is chosen from the set $\{1, 2, \ldots, N\}$.

In a third sub-embodiment of the fourth embodiment according to the principles of the present invention, the parameter vector $n=[n_1, \ldots, n_K]$ used in the above two sub-embodiments is the same for all cells. The parameter vector $n=[n_1, \ldots, n_K]$ can be communicated to the UE by means of higher-layer signaling.

In a fourth sub-embodiment of the fourth embodiment according to the principles of the present invention, the parameter vector $n=[n_1, \ldots, n_K]$ is a function of CELL ID, denoted by n=f(c_id). Therefore, for a different c_id, we can have a different parameter vector $n=[n_1, \ldots, n_K]$. One example of such a function is:

$$n_k=mod(c_id-1,N_k)+1. \quad (17)$$

As an example, we apply this set of embodiments is to the 18 resources in Table 2. We first divide them into K=3 groups, with six resources in each group, i.e. $N_1=N_2=N_3=6$. The division of the resources is shown in Table 7. Note in this example, all OC/CS combos that belong to the same OC code are grouped into a subset, for a given slot.

TABLE 7

One example of dividing the resources in TABLE 2 into 3 groups, each with 6 resources.

| | Resources Combos in Slot #1 | Resources Combos in Slot #2 |
|---|---|---|
| Subset 1 | $\{CB_1[1], \ldots, CB_1[6]\}$ | $\{CB_2[1], \ldots, CB_2[6]\}$ |
| Subset 2 | $\{CB_1[7], \ldots, CB_1[12]\}$ | $\{CB_2[7], \ldots, CB_2[12]\}$ |
| subset K | $\{CB_1[13], \ldots, CB_1[18]\}$ | $\{CB_2[13], \ldots, CB_2[18]\}$ |

In addition, the slot-level resource remapping can be tabulated in the below. Here we have used the permutation equation $d=P_G(c,n_k,N_k)$ to derive index $i_{k,d}$ from each input index $i_{k,c}$. In particular, we have used the option $d=P_{G,3}(c, n_k,N_k)=mod(c \times n_k,N_k+1)$ since $N_k+1=7$ is a prime number and GF(7) is a ground Galois field.

TABLE 8(a)

Resource re-mapping for subset 1

| Resource index in slot #2 | Resource index in slot #1 | | | | | |
|---|---|---|---|---|---|---|
| $i_{1,d}=g_1(i_{1,c}, n_1)$ | $i_{1,c}=1$ | $i_{1,c}=2$ | $i_{1,c}=3$ | $i_{1,c}=4$ | $i_{1,c}=5$ | $i_{1,c}=6$ |
| $n_1=1$ | 1 | 2 | 3 | 4 | 5 | 6 |
| $n_1=2$ | 2 | 4 | 6 | 1 | 3 | 5 |

TABLE 8(a)-continued

Resource re-mapping for subset 1

| Resource index in slot #2 | Resource index in slot #1 | | | | | |
|---|---|---|---|---|---|---|
| $i_{1,d}=g_1(i_{1,c}, n_1)$ | $i_{1,c}=1$ | $i_{1,c}=2$ | $i_{1,c}=3$ | $i_{1,c}=4$ | $i_{1,c}=5$ | $i_{1,c}=6$ |
| $n_1=3$ | 3 | 6 | 2 | 5 | 1 | 4 |
| $n_1=4$ | 4 | 1 | 5 | 2 | 6 | 3 |
| $n_1=5$ | 5 | 3 | 1 | 6 | 4 | 2 |
| $n_1=6$ | 6 | 5 | 4 | 3 | 2 | 1 |

TABLE 8(b)

Resource remapping for subset 2.

| Resource index in slot #2 | Resource index in slot #1 | | | | | |
|---|---|---|---|---|---|---|
| $i_{2,d}=g_2(i_{2,c}, n_2)$ | $i_{2,c}=7$ | $i_{2,c}=8$ | $i_{2,c}=9$ | $i_{2,c}=10$ | $i_{2,c}=11$ | $i_{2,c}=12$ |
| $n_2=1$ | 7 | 8 | 9 | 10 | 11 | 12 |
| $n_2=2$ | 8 | 10 | 12 | 7 | 9 | 11 |
| $n_2=3$ | 9 | 12 | 8 | 11 | 7 | 10 |
| $n_2=4$ | 10 | 7 | 11 | 8 | 12 | 9 |
| $n_2=5$ | 11 | 9 | 7 | 12 | 10 | 8 |
| $n_2=6$ | 12 | 11 | 10 | 9 | 8 | 7 |

TABLE 8(c)

Resource remapping for subset 3,

| Resource index in slot #2 | Resource index in slot #1 | | | | | |
|---|---|---|---|---|---|---|
| | $i_{3,c}=13$ | $i_{3,c}=14$ | $i_{3,c}=15$ | $i_{3,c}=16$ | $i_{3,c}=17$ | $i_{3,c}=18$ |
| $i_{3,d}=g(i_{3,c})$, $n_3=1$ | 13 | 14 | 15 | 16 | 17 | 18 |
| $i_{3,d}=g(i_{3,c})$, $n_3=2$ | 14 | 16 | 18 | 13 | 15 | 17 |
| $i_{3,d}=g(i_{3,c})$, $n_3=3$ | 15 | 18 | 14 | 17 | 13 | 16 |
| $i_{3,d}=g(i_{3,c})$, $n_3=4$ | 16 | 13 | 17 | 14 | 18 | 15 |
| $i_{3,d}=g(i_{3,c})$, $n_3=5$ | 17 | 15 | 13 | 18 | 16 | 14 |
| $i_{3,d}=g(i_{3,c})$, $n_3=6$ | 18 | 17 | 16 | 15 | 14 | 13 |

As we seen in the table above, since $N_1=N_2=N_3=6$, there are six possible remapping functions within each subset. Therefore, there are a total of $6^3$ parameter vectors n, and thus $6^3$ possible resource remapping function g(i,n) over the overall set of eighteen OC/CS combos. We will only list in the table below three examples including $n=[n_1,n_2,n_3]=[2, 2,2]$, or [1,2,3], or [2,3,4].

TABLE 9

Overall resource remapping table, where re-mappings take place within each subsets.

| Resource index in second slot | Resource in the first slot, i | | | | | | | | | | | | | | | | | |
|---|---|---|---|---|---|---|---|---|---|---|---|---|---|---|---|---|---|---|
| g(i, n) | 1 | 2 | 3 | 4 | 5 | 6 | 7 | 8 | 9 | 10 | 11 | 12 | 13 | 14 | 15 | 16 | 17 | 18 |
| $n = [n_1, n_2, n_3] = [1, 2, 3]$ | 1 | 2 | 3 | 4 | 5 | 6 | 8 | 10 | 12 | 7 | 9 | 11 | 15 | 18 | 14 | 17 | 13 | 16 |
| $n = [n_1, n_2, n_3] = [2, 2, 2]$ | 2 | 4 | 6 | 1 | 3 | 5 | 8 | 10 | 12 | 7 | 9 | 11 | 14 | 16 | 18 | 13 | 15 | 17 |
| $n = [n_1, n_2, n_3] = [2, 3, 4]$ | 2 | 4 | 6 | 1 | 3 | 5 | 9 | 12 | 8 | 11 | 7 | 10 | 16 | 13 | 17 | 14 | 18 | 15 |

2.3 Inter-Subset Switching

In a fifth embodiment according to the principles of the present invention, we propose to divide the N resources into K subsets, with each subset having $N_1, N_2, \ldots, N_K$ elements and such that $$\sum_{k=1}^{K} N_k = N.$$

Furthermore, the subsets in slot#1 and slot #2 have the same indices. The formation of these subsets are shown in Table 6, similar to the previous embodiment. In addition, in this embodiment, we assume the number of elements within each subset to be the same, i.e., $N_1=N_2= \ldots =N_K$.

We now propose a resource remapping scheme where we perform a subset-wise switching between different subsets. We denote this operation by $PG[s_1, s_2, \ldots, s_K]$ where $1 \leq s_1, \ldots, s_K \leq K$ are indices that indicate the switching pattern in the following way: subset # $s_1$ in the first slot is remapped to subset #1 in the second slot, #$s_2$ in the first slot is remapped to subset #2 in the second slot, etc. The intra-subset index of each resource element does not change in this switching operation. If a resource in the first slot is denoted by $CB_1[i]$, then after remapping, the resource is denoted by $CB_2[w(i,PG[s_1, s_2, \ldots, s_K])]$ (or concisely, $CB_2[w(i,PG[\bullet])]$) in the second slot. In other words, if a UE picks the resource combination $CB_1[i]$ in the first slot, then it must be assigned $CB_2[g(w(i,PG[s_1, s_2, \ldots, s_K]),n)]$ in the second slot.

In a first sub-embodiment of the fifth embodiment according to the principles of the present invention, the inter-subset switching pattern $PG[s_1, s_2, \ldots, s_K.]$ is the same for all cells. The parameter $PG[s_1, s_2, \ldots, s_K.]$ can be communicated to the UE by means of higher-layer signaling.

In a second sub-embodiment of the fifth embodiment according to the principles of the present invention, the inter-subset switching pattern $PG[s_1, s_2, \ldots, s_K]$ is a function of CELL ID, denoted by $PG[s_1, s_2, \ldots, s_K.]=e(c_id)$. Therefore, for a different c_id, we can have a different inter-subset switching pattern $PG[s_1, s_2, \ldots, s_K]$.

For example, we can divide the eighteen OC/CS resources as shown in Table 2 into three subsets in each slot. In this example, each subset corresponds to all the resource combos on one OC code. The three subsets in slot #1 are given by $G1[1]=\{CB_1[1], \ldots, CB_1[6]\}$, $G1[2]=\{CB_1[7], \ldots, CB_1[12]\}$ and $G1[3]=\{CB_1[13], \ldots, CB_1[18]\}$. The subsets in slot #2 are similarly defined as G2[1], G2[2] and G2[3]. We now denote PG[2,3,1] as a subset-wise resource-mapping that maps the resources in subset G1[2] to subset G2[1], subset G1[3] to G2[2] and subset G1[1] to subset G2[3], etc. Similarly we can define PG[1,3,2], PG[2,1,3], PG[3,1,2], PG[3,2,1]. Several examples of the function g(i, PG[.]) that associates the resource combo $CB_1[i]$ in the first slot and $CB_2[w(i,PG[\bullet])]$ in the second slot are given in Table 10.

TABLE 10

Example of subset-wise resource switching

| Resource index in second slot, | Resource index in the first slot, i | | | | | | | | | | | | | | | | | |
|---|---|---|---|---|---|---|---|---|---|---|---|---|---|---|---|---|---|---|
| w(i, PG[.]) | 1 | 2 | 3 | 4 | 5 | 6 | 7 | 8 | 9 | 10 | 11 | 12 | 13 | 14 | 15 | 16 | 17 | 18 |
| PG[1, 3, 2] | 1 | 2 | 3 | 4 | 5 | 6 | 13 | 14 | 15 | 16 | 17 | 18 | 7 | 8 | 9 | 10 | 11 | 12 |
| PG[2, 1, 3] | 7 | 8 | 9 | 10 | 11 | 12 | 1 | 2 | 3 | 4 | 5 | 6 | 13 | 14 | 15 | 16 | 17 | 18 |
| PG[3, 1, 2] | 13 | 14 | 15 | 16 | 17 | 18 | 1 | 2 | 3 | 4 | 5 | 6 | 7 | 8 | 9 | 10 | 11 | 12 |
| PG[3, 2, 1] | 13 | 14 | 15 | 16 | 17 | 18 | 7 | 8 | 9 | 10 | 11 | 12 | 1 | 2 | 3 | 4 | 5 | 6 |
| PG[2, 3, 1] | 7 | 8 | 9 | 10 | 11 | 12 | 13 | 14 | 15 | 16 | 17 | 18 | 1 | 2 | 3 | 4 | 5 | 6 |

2.4 Combination of Intra-Subset Remapping and Inter-Subset Switching

In a sixth embodiment according to the principles of the present invention, we propose to combine the intra-subset remapping and inter-subset switching described in previous embodiments. If a resource in the first slot is denoted by $CB_1[i]$, then after remapping, the resource is denoted by $CB_2[g(w(i,PG[s_1, s_2, \ldots, s_K]),n)]$ (or concisely, $CB_2[g(w(i,PG[\bullet]),n)]$) in the second slot. Note we use the composite function $g(w(i, PG[\bullet]),n)$ to indicate the combined operation of inter-subset switching and intra-subset permutation. Here $PG[s_1, s_2, \ldots, s_K]$ is the inter-subset switching pattern, and $n=[n_1, \ldots, n_K]$ is the intra-subset remapping parameter vector. This applies to both cases where the intra-subset permutation $g(\bullet,n)$ function is GF based, or PBRO based, as defined in Section 2.3.

In a first sub-embodiment of the sixth embodiment according to the principles of the present invention, the inter-subset switching pattern $PG[s_1, s_2, \ldots, s_K]$ and/or parameter vector $n=[n_1, \ldots, n_K]$ are the same for all cells. The parameter $PG[s_1, s_2, \ldots, s_K]$ and $n=[n_1, \ldots, n_K]$ can be communicated to the UE by means of higher-layer signaling.

In a second sub-embodiment of the sixth embodiment according to the principles of the present invention, the inter-subset switching pattern $PG[s_1, s_2, \ldots, s_K]$ and/or parameter vector $n=[n_1, \ldots, n_K]$ are functions of CELL ID, denoted by $PG[s_1, s_2, \ldots, s_K]=e(c_id)$ and $n=f(c_id)$. Therefore, for a different c_id, we can have a different inter-subset switching pattern $PG[s_1, s_2, \ldots, s_K]$ and/or parameter vector $n=[n_1, \ldots, n_K]$.

We show in the Table 11 below how the intra-subset permutation can be combined with the inter-subset switching, using the same 18 resource example in Table 2. In this example, we have used GF based intra-subset permutation function $$g(i,n)=g_k(i_{k,c},n_k)=i_{k,d} \text{ for the k,c such that } i=i_{k,c}; \text{ and} \tag{18}$$

$$d=P_{G,3}(c,n_k,N_k)=\mathrm{mod}(c\times n_k,N_k+1). \tag{19}$$

Note $N_1=N_2=N_3=6$ in this example where 18 resource combos are divided into 3 subsets.

TABLE 11

Example of resource remapping with both intra-subset permutation and inter-subset switching.

| Resource index in second slot, | Resource index in the first slot, i | | | | | | | | | | | | | | | | | |
|---|---|---|---|---|---|---|---|---|---|---|---|---|---|---|---|---|---|---|
| g(w(i, PG[.]), n) | 1 | 2 | 3 | 4 | 5 | 6 | 7 | 8 | 9 | 10 | 11 | 12 | 13 | 14 | 15 | 16 | 17 | 18 |
| PG[1, 3, 2], n = [1, 2, 3] | 1 | 2 | 3 | 4 | 5 | 6 | 15 | 18 | 14 | 17 | 13 | 16 | 8 | 10 | 12 | 7 | 9 | 11 |
| PG[1, 3, 2], n = [2, 2, 2] | 8 | 10 | 12 | 7 | 9 | 11 | 2 | 4 | 6 | 1 | 3 | 5 | 14 | 16 | 18 | 13 | 15 | 17 |

2.5 Combining the OC/CS Resource Remapping Schemes with Cell-Specific CS Hopping In a seventh embodiment according to the principles of the present invention, we propose to combine the slot-level OC/CS combo resource-permutation methods described in the above Sections 2.1-2.4 with a cell-specific symbol-level CS resource hopping pattern, denoted by h_sym(c_id,s_id, l_id), where the CELL ID is denoted by c_id, the subframe ID is denoted by s_id, and the OFDM symbol (Long block) ID within a subframe is denoted by l_id. The additional cell-specific hopping step is carried out by cyclically shift the CS resource on a particular OFDM by the amount specified by h_sym(c_id,s_id,l_id).

In an eighth embodiment according to the principles of the present invention, we propose to combine the symbol-level CS resource-permutation methods described in the above embodiments in Sections 2.1-2.4 with a cell-specific slot-level CS resource hopping pattern, denoted by h_slot (c_id,sl_id), where the CELL ID is denoted by c_id, the slot ID is denoted by sl_id. The additional cell-specific hopping step is carried out by cyclically shift the CS resource on a particular OFDM by the amount specified by h_slot(c_id, sl_id).

We further describe in detail how to combine the OC/CS resource combo permutation and cell-specific hopping proposed in the seventh and eighth embodiments. Let the possible values of CS in all OC/CS combos in the discussion be K, and K is also the maximum hop value. Let $CB_1[i]=\langle OC_1[u_i], CS_1[v_i]\rangle$ be the resource combo in the first slot, and let $CB_1[i]=\langle OC_1[u_i],CS_1[v_i]\rangle$ be associated/remapped with $CB_2[j]=\langle OC_2[u_j],CS_2[v_i]\rangle$ in the second slot, according to any of the permutation methods described in Sections 2.1-2.4. Then if symbol-level cell-specific hopping in the seventh embodiment is used, the CS index i in the first slot of a subframe will hop to cyclic_shift($v_i$,h_sym(c_id,s_id, l_id),K) for an OFDM symbol having an index of l_id; and the CS index j in the second slot of a subframe will hop to cyclic_shift($v_j$,h_sym(c_id,s_id,l_id),K). Similarly, if slot-level cell-specific hopping is used, the CS index i in the first slot of a subframe will hop to cyclic_shift($v_i$,h_slot(c_id, sl_id),K) for an OFDM symbol having an index of l_id; and the CS index j in the second slot of the subframe will hop to cyclic_shift($v_j$,h_slot(c_id,sl_id),K).

Note that the cyclic shift operation is defined as:

$$\text{cyclic_shift}(a,b,N)=\mathrm{mod}(a+b-1,N)+1, \tag{20}$$

if the N resources are indexed as 1, 2, . . . , N (this is the case throughout this document). On the other hand, if the N resources are indexed as 0, 1, 2, . . . , N−1, then the cyclic shift operation is defined as:

$$\text{cyclic_shift}(a,b,N),\ \mathrm{mod}(a+b,N). \tag{21}$$

3. Symbol-Level and Slot-Level Resource Remapping for Cyclic Shift Resources

The CS resource assignment/remapping is applicable to the following cases:

1. An uplink control RB that contains only Channel Quality Indicator (CQI) channels;
2. An uplink control RB that contains both CQI and ACK/NACK channels; and
3. An uplink control RB that contains only ACK/NACK channels. Note that uplink service grant request channel may reuse the structure of uplink ACK/NACK channel.

3.1. Symbol-Level CS Remapping

In a ninth embodiment according to the principles of the present invention, we propose to associate the CS resources in such a way that if some channel of a UE (for example, CQI, ACK/NACK) is allocated the CS resource $CS_1[m]$ in the first OFDM symbol (l_id=1), then it must be assigned $CS_{l_id}[t(m,l_id,n)]$ in the OFDM symbols where l_id>1, where t(m,l_id,n) is a pseudo-random resource remapping/permutation function that is a function of the input resource index m, the OFDM symbol index l_id, and parameter n that is an integer. Note that m=1, 2, . . . , M and M is the total number of CS resources in each OFDM symbol.

We further note that when applied to UL A/N channel (or serving grant), the symbol-level CS remapping can be combined with slot-level OC-remapping or OC hopping. Slot-level OC remapping is very similar to the slot-level OC/CS combo resource remapping that was discussed throughout the draft, except that the resource being remapping from one slot to the next is only the OC resource, not OC/CS combo resource. OC hopping has the same meaning as OC hopping in this context.

We note that by definition, t(m,l_id,n)=m for l_id=1, for the first OFDM symbol under consideration.

In a first sub-embodiment of the ninth embodiment according to the principles of the present invention, the pseudo-random permutation function is established by:

$$t(m,l_id,n)=P_G(m,r(l_id,n,M),M),\ \text{for } l_id>1 \tag{22}$$

where r(l_id,n,M)=mod(l_id+n−1,M)+1. The Galois field based remapping/permutation function $P_G(m,r,M)$ is defined in the previous section.

In a second sub-embodiment of the ninth embodiment according to the principles of the present invention, the pseudo-random permutation function uses the PBRO function in such a way:

$$t(m,l_id,n)=PBRO(mod(m+l_id+n-1,M)+1,M),\ \text{for } l_id>1 \tag{23}$$

The function PBRO(a,b) is defined in the introduction.

In a third sub-embodiment of the ninth embodiment according to the principles of the present invention, the parameter n in the above two sub-embodiments is the same for all cells. The parameter n can be communicated to the UE by means of higher-layer signaling.

In a fourth sub-embodiment of the ninth embodiment according to the principles of the present invention, the parameter n is a function of CELL ID, denoted by n=f(c_id). Therefore, for a different c_id, we will have a different parameter n. One example of such a function is n=mod (c_id−1,N)+1.

For example, if there are six CS resources in each uplink OFDM symbol, or M=6, and there are L=8 uplink OFDM symbols being considered here. Then one example to let n=0, and let $t(m, l_id,n)=P_{G,3}(m,r(l_id,0,6),6)$. Note here we are able to use the $P_{G,3}(\bullet,\bullet,\bullet)$ function defined earlier, since M+1=7 and GF(7) is a ground Galois field. The resource remapping/association as a function of OFDM symbol index, l_id, is shown in Table 12 below. Here the parameter n is chosen as 0.

TABLE 12

Example of CS resource remapping as a function of OFDM symbol id. M = 6, L = 8.

| | Remapped CS resource index t(m, l_id, 0) | | | | | | | |
|---|---|---|---|---|---|---|---|---|
| | L_id = 1 | l_id = 2 | l_id = 3 | l_id = 4 | l_id = 5 | l_id = 6 | l_id = 7 | l_id = 8 |
| M = 1 | 1 | 2 | 3 | 4 | 5 | 6 | 1 | 2 |
| 2 | 2 | 4 | 6 | 1 | 3 | 5 | 2 | 4 |
| 3 | 3 | 6 | 2 | 5 | 1 | 4 | 3 | 6 |
| 4 | 4 | 1 | 5 | 2 | 6 | 3 | 4 | 1 |
| 5 | 5 | 3 | 1 | 6 | 4 | 2 | 5 | 3 |
| 6 | 6 | 5 | 4 | 3 | 2 | 1 | 6 | 5 |

3.2 Slot-Level CS Remapping

In a tenth embodiment according to the principles of the present invention, we propose to associate the CS resources in such a way that if some channel of a UE (for example, CQI, ACK/NACK) is allocated the CS resource CS, [m] in the first slot, then the channel must be assigned $CS_2[g(m,n)]$ in the second slot, where g(m,n) is a pseudo-random resource remapping/permutation function that is a function of the input resource index m, and a parameter n that is an integer.

We further note that when applied to UL A/N channel (or serving grant), the slot-level CS remapping can be combined with slot-level OC-remapping or OC hopping.

In a first sub-embodiment of the tenth embodiment according to the principles of the present invention, the pseudo-random permutation function is established by:

$$g(m,n)=P_G(m,n,M), \tag{24}$$

where n is chosen from the set [1, . . . , M], or n=1, . . . , M. The function $P_G(m,n,M)$ is defined in the previous section.

In a second sub-embodiment of the tenth embodiment according to the principles of the present invention, the pseudo-random permutation function uses the PBRO function in such a way:

$$g(m,n)=PBRO(mod(m+n-1,M)+1,M). \tag{25}$$

The function PBRO(a,b) is defined in the introduction.

In a third sub-embodiment of the tenth embodiment according to the principles of the present invention, the parameter n in the above two sub-embodiments is the same for all cells. The parameter n can be communicated to the UE by means of higher-layer signaling.

In a fourth sub-embodiment of the tenth embodiment according to the principles of the present invention, the parameter n is a function of CELL ID, denoted by n=f(c_id). Therefore, for a different c_id, we will have a different parameter n. One example of such a function is n=mod (c_id−1,M)+1.

We consider here below an example of M=6, for n=1, 2, 3, 4.

TABLE 13

Example of slot-level CS remapping with M = 6.

| m | 1 | 2 | 3 | 4 | 5 | 6 |
|---|---|---|---|---|---|---|
| G(m, n), n = 1 | 1 | 2 | 3 | 4 | 5 | 6 |
| G(m, n), n = 2 | 2 | 4 | 6 | 1 | 3 | 5 |
| G(m, n), n = 3 | 3 | 6 | 2 | 5 | 1 | 4 |
| G(m, n), n = 4 | 4 | 1 | 5 | 2 | 6 | 3 |

TABLE 13-continued

Example of slot-level CS remapping with M = 6.

| m | 1 | 2 | 3 | 4 | 5 | 6 |
|---|---|---|---|---|---|---|
| G(m, n), n = 5 | 5 | 3 | 1 | 6 | 4 | 2 |
| G(m, n), n = 6 | 6 | 5 | 4 | 3 | 2 | 1 |

The application of the slot-level CS remapping to a dedicated CQI or dedicated A/N uplink RB is straightforward, and therefore we do not provide additional explanation. On the other hand, the application of slot-level CS remapping to a mixed CQI and A/N uplink RB is less obvious, and we provide an example below to show how it works.

Here we show an example of how to apply the slot-level CS remapping in the case of mixed ACK/NACK and CQI channels within one RB (12 subcarriers). Here the total number of CSs used by ACK/NACK and CQI is 8 (M=8), and there are a total of 8 ACK/NACK channels sharing 5 CSs, and three CQI channels sharing 3 CSs. The CS remapping function used in this example is g(m,n) with n=2. Note since M+1=9 and GF(9)=GF($3^2$) is a Galois field but not a ground Galois field. The non-zero elements of GF(9) is given in the Table 14 below.

TABLE 14

Elements of GF(9)

| exponent format | $\alpha^0$ | $\alpha^1$ | $\alpha^2$ | $\alpha^3$ | $\alpha^4$ | $\alpha^5$ | $\alpha^6$ | $\alpha^7$ |
|---|---|---|---|---|---|---|---|---|
| vector format (ternary)[LSB, MSB] | [1, 0] | [0, 1] | [1, 1] | [1, 2] | [2, 0] | [0, 2] | [2, 2] | [2, 1] |
| natural number format | 1 | 3 | 4 | 7 | 2 | 6 | 8 | 5 |

The mapping table of g(m,n) for n=2 is given below for M=8 with GF(9), and $g(m,n)=P_{G,1}(m,n,M)=P_{G,1}(m,2,8)$, where $P_{G,1}(m,n,M)$ is defined in Section 1.

TABLE 15-a

CS remapping with g(m, 2), M = 8.

| m | 1 | 2 | 3 | 4 | 5 | 6 | 7 | 8 |
|---|---|---|---|---|---|---|---|---|
| g(m, n), n = 2 | 3 | 6 | 4 | 7 | 1 | 8 | 2 | 5 |

Alternatively, we can use the pruned ground GF field based method $g(m,n)=P_{G,4b}(m,n,M)$ $P_{G,4b}(m,2,8)$ to generate the following table.

TABLE 15-b

Slot-level remapping with g(i, n), N = 8, n = 2.

| M | 1 | 2 | 3 | 4 | 5 | 6 | 7 | 8 |
|---|---|---|---|---|---|---|---|---|
| g(m, n), n = 2 | 2 | 4 | 6 | 8 | 1 | 3 | 5 | 7 |

We proceed to show how the CS resource re-mapping works in table below. Note that there are M=8 CSs, and remapping only takes place within this set of "used" CSs. We applied the CS remapping rules in Table 15-a above to reach this table below. Notice how a single A/N channel or CQI channel can be remapped to different regions in the OC/CS table.

TABLE 16

CS remapping in mixed CQI and ACK/NACK channel uplink RB.

| Cyclic shift value - | OC/CS Combos in slot #1 - $CB_1$[ ](ACK/NCK) CS in slot #1 - $CS_{1,CQI}$[ ] (CQI) | | | OC/CS Combos in slot #1 - $CB_2$[ ](ACK/NCK) CS in slot #1 - $CS_2$[ ] (CQI) | | |
|---|---|---|---|---|---|---|
| [used CS] | $OC_1[1]$ | $OC_1[2]$ | $OC_1[3]$ | $OC_2[1]$ | $OC_2[2]$ | $OC_2[3]$ |
| 0 = [1] | A/N #1 | | A/N #6 | A/N#3 | | A/N #8 |
| 1 [2] | | A/N #4 | | CQI #2 | | |
| 2 [3] | A/N #2 | | A/N #7 | A/N #1 | | A/N #6 |
| 3 [4] | | A/N #5 | | A/N #2 | | A/N #7 |
| 4 [5] | A/N #3 | | A/N #8 | CQI #3 | | |
| 5- | | | | | | |
| 6 [6] | | CQI #1 | | | A/N #4 | |
| 7- | | | | | | |
| 8-[7] | | CQI #2 | | | A/N #5 | |
| 9- | | | | | | |
| 10-[8] | | CQI #3 | | | CQI #1 | |
| 11- | | | | | | |

3.3 Alternative Method for Resource Remapping in the Mixed CQI and ACK/NACK Case In Table 16, it can be seen that four A/N channels, A/N #1, 2, 6, 7 are assigned to neighboring CSs, after the joint CS remapping on CQI and A/N channels. This may degrade A/N performance. In this subsection, we propose an alternative approach for resource remapping in the mixed CQI and ACK/NACK case.

In an eleventh embodiment according to the principles of the present invention, we propose to divide the total CS resources within one RB into two parts, one part allocated to CQI channel and the other part allocated to the ACK/NACK (or Serving request) channel. The allocation is fixed in two slots of a subframe. In addition, within the part of CSs assigned to the CQI channel, both the symbol-level CS remapping proposed in Section 3.1 and slot-level CS remapping proposed in Section 3.2 can be applied. On the other hand, within the CS resources allocated to the uplink A/N channels (or serving request), we can apply any of the following (a) the joint slot-level joint OC/CS remapping described in Section 2.1-2.4; (b) the symbol-level CS remapping described in Section 3.1; (c) the slot-level CS remapping described in Section 3.2.

We reuse the eight A/N channel and three CQI channel example used in Table 16 to illustrate this alternative approach. Furthermore, in this example, we use the slot-level global OC/CS remapping (Section 2.1) for the A/N part, and use slot-level CS remapping for the CQI part. It is clear from Table 17 that CS resources assigned to the A/N part and the CQI part remain the same in slot #1 and slot #2.

TABLE 17

Illustration of alternative method of resource remapping in the uplink RB with mixed CQI and ACK/NACK channel.

| Cyclic shift value - | OC/CS Combos in slot #1 - $CB_1$[ ](ACK/NCK) CS in slot #1 - $CS_{1,CQI}$[ ] (CQI) | | | OC/CS Combos in slot #1 - $CB_2$[ ](ACK/NCK) CS in slot #1 - $CS_2$[ ] (CQI) | | |
|---|---|---|---|---|---|---|
| [used CS] | $OC_1[1]$ | $OC_1[2]$ | $OC_1[3]$ | $OC_2[1]$ | $OC_2[2]$ | $OC_2[3]$ |
| 0 = [1] | $CB_1[1]$ | | $CB_1[6]$ | $CB_2[1]$ | | $CB_2[6]$ |
| 1 [2] | | $CB_1[4]$ | | | $CB_2[4]$ | |
| 2 [3] | $CB_1[2]$ | | $CB_1[7]$ | $CB_2[2]$ | | $CB_2[7]$ |
| 3 [4] | | $CB_1[5]$ | | | $CB_2[5]$ | |

TABLE 17-continued

Illustration of alternative method of resource remapping in the uplink RB with mixed CQI and ACK/NACK channel.

| Cyclic shift value - | OC/CS Combos in slot #1 - $CB_1$[ ](ACK/NCK) CS in slot #1 - $CS_{1,CQI}$[ ] (CQI) | | | OC/CS Combos in slot #1 - $CB_2$[ ](ACK/NCK) CS in slot #1 - $CS_2$[ ] (CQI) | | |
|---|---|---|---|---|---|---|
| [used CS] | $OC_1[1]$ | $OC_1[2]$ | $OC_1[3]$ | $OC_2[1]$ | $OC_2[2]$ | $OC_2[3]$ |
| 4 [5] | $CB_1[3]$ | | $CB_1[8]$ | $CB_2[3]$ | | $CB_2[8]$ |
| 5-6 [6] | | $CS_{1,CQI}[1]$ | | | $CS_{2,CQI}[1]$ | |
| 7-8-[7] | | $CS_{1,CQI}[2]$ | | | $CS_{2,CQI}[2]$ | |
| 9-10-[8] | | $CS_{1,CQI}[3]$ | | | $CS_{2,CQI}[3]$ | |
| 11- | | | | | | |

In addition, for the A/N (or serving grant) channels, if an A/N channel is assigned the resource combo $CB_1[i]$ in the first slot, then the A/N channel must be assigned $CB_2[g(i,n)]$ in the second slot. Let n=2. One example of g(i,n) is to let $g(i,n)=P_{G,1}(i,2,8)$ (note N=8 in this example indicating a total of 8 OC/CS combinations for A/N channel, and GF(9) exists). The mapping table is the same as in Table 15-a or 15-b, if we replace m with i, and M with N.

For the CQI channels, on the other hand, if a CQI channel is assigned the CS resource $CS_1[m]$ in the first slot, then CQI channel must be assigned $CS_2[g(m,n)]$ in the second slot. Similarly, let n=2. One example of g(m,n) is to let $g(m,n)=P_{G,1}(m,2,3)$ (note M=3 in this example indicating a total of 3 CS resources for A/N channel, and CF(4) exists). The mapping table is omitted here for brevity.

3.4 Combining CS Resource Mapping and Cell-Specific Hopping

In a twelfth embodiment according to the principles of the present invention, we propose to combine the symbol-level CS resource-permutation methods described in the above embodiment with a cell-specific symbol-level CS resource hopping pattern, denoted by h_sym(c_id,s_id,l_id), where the CELL ID denoted by c_id, the subframe ID denoted by s_id, and the OFDM symbol (Long block) ID within a subframe denoted by l_id. The additional cell-specific hopping step is carried out by cyclically shift the CS resource on a particular OFDM by the amount specified by h_sym(c_id, s_id,l_id).

In a thirteenth embodiment according to the principles of the present invention, we propose to combine the symbol-level CS resource-permutation methods described in the above embodiment with a cell-specific slot-level CS resource hopping pattern, denoted by h_slot(c_id,sl_id), where the CELL ID denoted by c_id, the slot ID denoted by sl_id. The additional cell-specific hopping step is carried out by cyclically shifting the CS resource on a particular OFDM by the amount specified by h_slot(c_id,sl_id).

We further describe in detail how to combine symbol-level CS resource permutation and cell-specific hopping proposed in the above two embodiments. Let the number of CS resources in the discussion be K, and K is also the maximum hop value. Let $CS_{l_id}[t(m,l_id,n)]$ denote the CS resource for the OFDM symbol l_id, according to the symbol-level remapping algorithms discussed earlier. Then if symbol-level cell-specific hopping is used, the CS index will hop to cyclic_shift(t(m,l_id,n),h_sym(c_id,s_id,l_id), K) for OFDM symbol l_id. Similarly, if slot-level cell-specific hopping is used, the CS index in the first slot will hop to cyclic_shift(t(m,l_id,n),h_slot(c_id,sl_id),K) for OFDM symbol index by l_id, in the slot indexed by sl_id.

The description of combination of slot-level CS resource remapping and slot or symbol-level cell-specific hopping is similar, and is omitted for brevity.

4. Generation of the Slot-Level or Symbol-Level Cell-Specific CS Hopping Pattern Let the maximum number of the hop value be denoted by K.

In a fourteenth embodiment according to the principles of the present invention, we propose a slot-level base sequence cell-specific pattern with a period of K consecutive slots. We propose a cell-specific slot-level hopping pattern such that:

$$h_slot(c_id,sl_id)=P_G(sl_id,r(c_id,n,K),K), \tag{26}$$

or, $$h_slot(c_id,sl_id)=PBRO(mod(sl_id+c_id+n-1,K)+1, K), \tag{27}$$

where the function r is defined as r(c_id,n,K)=mod(c_id+n−1,K)+1. Note sl_id=1, . . . , K is the slot index of the slot within the K consecutive slots, n is a parameter that is an integer, and c_id denotes the CELL ID. The Galois field based remapping/permutation function $P_G(c_id,r,K)$ is defined in Section 1. The PBRO function is previously defined.

For example, if there are twelve subcarriers in the LTE uplink control channel PUCCH, and thus the maximum hop K=12. Then one example to let n=0, and let $h_slot(c_id, sl_id)=P_{G,3}(sl_id,r(c_id,0,12),12)=mod(sl_id\times r(c_id,0,12), 13)$. Note here we are able to use the $P_{G,3}(\bullet,\bullet,\bullet)$ function defined earlier, since 12+1=13 and GF(13) is a ground Galois field.

We again let the maximum number of the hop value be denoted by K. Furthermore, we let the L be the number of OFDM symbols of interest within a subframe.

In a fifteenth embodiment according to the principles of the present invention, we propose a symbol-level base sequence cell-specific pattern that repeats every subframe, i.e., it is not a function of subframe ID. Denoting, s_id as subframe ID, we propose a cell-specific slot-level hopping pattern such that $$h_sym(c_id,s_id,l_id)=P_G(x(l_id,K),r(c_id,n,K),K), \tag{28}$$

or $$h_sym(c_id,s_id,l_id)=PBRO(mod(l_id+c_id+n-1, K)+1,K), \tag{29}$$

where the function x and r is defined as x(l_id,K)=mod(l_id−1,K)+1 and r(c_id,n,K)=mod(c_id+n−1,K)+1. Note l_id=1, . . . , L denotes the OFDM symbol (long block) ID, n is a parameter that is an integer, s_id denotes the subframe ID, and c_id denotes the CELL ID. The Galois field based remapping/permutation function $P_G(x,r,K)$ is defined in Section 1. The PBRO function is defined in the introduction.

For example, if there are 12 subcarriers in the LTE uplink control channel PUCCH, and thus the maximum hop K=12. Then one example to let n=0, and let $h_sym(c_id,s_id, l_id)=P_{G,3}(x(l_id,12),r(c_id,0,12),12)=mod(x(l_id,12)\times r(c_id,0,12),13)$. Note here we are able to use the $P_{G,3}(\bullet,\bullet,\bullet)$ function, defined earlier, since 12+1=13 and GF(13) is a ground Galois field.

5. Generation of the Subframe-Level or Slot-Level Base Sequence Hopping Pattern

In a sixteenth embodiment according to the principles of the present invention, let there be a total of Z base sequences for uplink communications. Then we propose a subframe-level base sequence hopping pattern with a period of Z consecutive subframes. In addition, for a given cell, let $BS_1[z]=z$ be the base sequence index in the first subframe within one period of Z consecutive subframes, then the base sequence index used in subsequent subframes in the same cell is denoted by $BS_{s_id}[s(z,s_id,n)]$. Here z=1, . . . , Z, s_id=1, . . . , Z, and n is a parameter that is an integer. Note s_id denotes the subframe ID within a period of Z subframes.

In a sub-embodiment of the sixteenth embodiment according to the principles of the present invention, the pseudo-random permutation function s(z,s_id,n) is given by:

$$s(z,s_id,n)=P_G(z,r(s_id,n,Z),Z) \tag{30}$$

or, $$s(z,s_id,n)=PBRO(mod(z+s_id+n-1,Z)+1,Z), \tag{31}$$

where the function r is defined as r(s_id,n,Z)=mod(s_id+n−1,Z)+1. The Galois field based remapping/permutation function $P_G(z,r,Z)$ is defined in the previous section. The PBRO(.,.) function is defined in the introduction.

For example, if there are thirty base sequences being used in a cellular system, or Z=30. Then one example to let n=0, and let s (z, s_id,n)=$P_{G,3}$(z,r(s_id,0,30),30)=mod(z x s_id, 31). Note here we are able to use the $P_G$ function defined earlier, since Z+1=31 and GF(31) is a ground Galois field.

There can be several slots within one subframe in the uplink transmission. For example, in the 3GPP LTE standard, there are 2 slots within each subframe in the uplink.

In a seventeenth embodiment according to the principles of the present invention, let there be a total of Z base sequences for uplink communications. Then we propose a slot-level base sequence hopping pattern with a period of Z consecutive slots. In addition, for a given cell, let BS, [z]=z be the base sequence index in the first slot within one period of Z consecutive slots, then the base sequence index used in subsequent slots in the same cell is denoted by $BS_{s_id}$ [s(z, sl_id,n)]. Here z=1, . . . , Z, sl_id=1, . . . , Z, and n is a parameter that is an integer. Note sl_id denotes slot ID within a period of Z slots.

In one sub-embodiment of the seventeenth embodiment according to the principles of the present invention, the pseudo-random permutation function s(z,sl_id,n) is given by $$s(z,sl_id,n)=P_G(z,r(sl_id,n,Z),Z), \tag{32}$$

or $$s(z,sl_id,n)=PBRO(mod(z+sl_id+n-1,Z)+1,Z), \tag{33}$$

where the function r is defined as r(sl_id,n,Z)=mod(sl_id+n−1,Z)+1. The Galois field based remapping/permutation function $P_G(z,r,Z)$ is defined in the previous section.

For example, if there are thirty base sequences being used in a cellular system, or Z=30. Then one example to let n=0, and let s(z, sl_id,n)=$P_{G,3}$(z,r(sl_id,0,30),30)=mod(z x sl_id, 31). Note here we are able to use the $P_{G,3}$ function defined earlier, since Z+1=31 and GF(31) is a ground Galois field. The PBRO(.,.) function is defined in the introduction.

Annex: Alternative OC/CS Resource Allocation for N=18 Resources (Excerpt from [6])

TABLE 18

Alternative OC/CS allocation scheme for N = 18.

| Cyclic Shift Index | Walsh Sequence Index 0 | 1 | 2 | 3 |
|---|---|---|---|---|
| 0 | 0 | | | 15 |
| 1 | 16 | 4 | | |
| 2 | | | 8 | |
| 3 | 1 | | | 12 |
| 4 | 17 | 5 | | |
| 5 | | | 9 | |
| 6 | 2 | | | 13 |
| 7 | | 6 | | |
| 8 | | | 10 | |
| 9 | 3 | | | 14 |
| 10 | | 7 | | |
| 11 | | | 11 | |

While the forgoing explanation of the principles of the present invention have been shown and described in detail in connection with the preferred embodiments, it will be apparent to those skilled in the art that modifications and variations can be made without departing from the spirit and scope of the invention as defined by the appended claims.

What is claimed is:

1. A method for data transmission in a communication system, the method comprising:

modulating data to be transmitted to generate a modulated data;

selecting a first resource to be used in a first time based on a function of a first time index;

selecting a second resource to be used in a second time based on the first time index and a second time index;

mapping the modulated data to the selected first resource and the selected second resource at the first time and the second time, respectively; and transmitting the *mapped,* modulated data at each of *the selected first resource at* the first time and *the selected second resource at* the second time, wherein the first resource and the second resource are at least one of an orthogonal code *defined on a per slot level based on a slot index* and a cyclic shift of a base *defined on a per symbol level based on a symbol index and defined a slot level based on a slot index*, wherein each of the first time and second time is defined on [at least one of] a symbol level and a slot level, and wherein a slot consists of at least one symbol.

2. The method of claim 1, wherein when the modulated data to be transmitted is acknowledgement and negative acknowledgement (ACK/NACK) data, the resource is an orthogonal code and a cyclic shift of a base.

3. The method of claim 1, wherein when the modulated data to be transmitted is Channel Quality Indicator (CQI) data, the resource is a cyclic shift of a base.

[4. The method of claim 1, wherein the cyclic shift of a base is defined on a per symbol level or a slot level based on a symbol index or a slot index, respectively.]

[5. The method of claim 1, wherein the orthogonal code is defined on a per slot level based on a slot index.]

6. The method of claim 1, wherein mapping the modulated data comprises symbol wise spreading the modulated data with the orthogonal code.

7. The method of claim 1, wherein selecting the first resource to be used in the first time and selecting the second resource to be used in the second time are based upon an amount of a total resource associated with a corresponding time index.

8. The method of claim 1, wherein when a total resource is shared by CQI transmission and ACK/NACK transmission, the total resource is separated into a portion for CQI transmission and a portion for ACK/NACK transmission.

9. The method of claim 8, wherein resource for CQI transmission and resource for ACK/NACK transmission are selected among the portion for CQI transmission and the portion for ACK/NACK transmission, respectively, at each corresponding time.

10. An apparatus in a wireless communication network, the apparatus comprising:

a transmitter chain configured to:

modulate data to be transmitted to generate a modulated data;

select a first resource to be used in a first time based on a function of a first time index;

select a second resource to be used in a second time based on the first time index and a second time index;

map the modulated data to the selected first resource and the selected second resource at the first time and the second time, respectively; and transmit the *mapped,* modulated data at each of *the selected first resource at* the first time and *the selected second resource at* the second time, wherein the first resource and the second resource are at least one of an orthogonal code *defined on a per slot level based on a slot index* and a cyclic shift of a base *defined on a per symbol level based on a symbol index and defined a slot level based on a slot index*, wherein each of the first time and second time is defined on at least one of a symbol level and a slot level, and wherein a slot consists of at least one symbol.

11. The apparatus of claim 10, wherein when the modulated data to be transmitted is acknowledgement and negative acknowledgement (ACK/NACK) data, the resource is an orthogonal code and a cyclic shift of a base.

12. The apparatus of claim 10, wherein when the modulated data to be transmitted is Channel Quality Indicator (CQI) data, the resource is a cyclic shift of a base.

[13. The apparatus of claim 10, wherein the cyclic shift of a base is defined on a per symbol level or a slot level based on a symbol index or a slot index, respectively.]

[14. The apparatus of claim 10, wherein the orthogonal code is defined on a per slot level based on a slot index.]

15. The apparatus of claim 10, wherein the transmitter chain is configured to map the modulated data by symbol wise spreading the modulated data with the orthogonal code.

16. The apparatus of claim 10, wherein the transmitter chain is configured to select the first resource to be used in the first time and select the second resource to be used in the second time based upon an amount of a total resource associated with a corresponding time index.

17. The apparatus of claim 10, wherein when a total resource is shared by CQI transmission and ACK/NACK transmission, the total resource is separated into a portion for CQI transmission and a portion for ACK/NACK transmission.

18. The apparatus of claim 17, wherein resource for CQI transmission and resource for ACK/NACK transmission are selected among the portion for CQI transmission and the portion for ACK/NACK transmission, respectively, at each corresponding time.

19. An apparatus in a wireless communication network, the apparatus comprising:

a receiver chain configured to:

receive modulated data mapped to a first resource at a first time, the first time based on a function of a first time index; and receive modulated data mapped to a second resource at a [first] *second* time, the second time based on the first time index and a second time index, wherein the first resource and the second resource are at least one of an orthogonal code *defined on a per slot level based on a slot index* and a cyclic shift of a base *defined on a per symbol level based on a symbol index and defined a slot level based on a slot index*, wherein each of the first time and second time is defined on at least one of a symbol level and a slot level, and wherein a slot consists of at least one symbol.

20. The apparatus of claim 19, wherein when the received data is acknowledgement and negative acknowledgement (ACK/NACK) data, the resource is an orthogonal code and a cyclic shift of a base.

21. The apparatus of claim 19, wherein when the received data is Channel Quality Indicator (CQI) data, the resource is a cyclic shift of a base.

[22. The apparatus of claim 19, wherein the cyclic shift of a base is defined on a per symbol level or a slot level based on a symbol index or a slot index, respectively.]

[23. The apparatus of claim 19, wherein the orthogonal code is defined on a per slot level based on a slot index.]

24. The apparatus of claim 19, wherein the modulated data is mapped using symbol wise spreading with the orthogonal code.

25. The apparatus of claim 19, wherein the first resource used in the first time and the second resource used in the second time are selected based upon an amount of a total resource associated with a corresponding time index.

26. The apparatus of claim 19, wherein when a total resource is shared by CQI transmission and ACK/NACK transmission, the total resource is separated into a portion for CQI transmission and a portion for ACK/NACK transmission.

27. The apparatus of claim 26, wherein resource for CQI transmission and resource for ACK/NACK transmission are selected among the portion for CQI transmission and the portion for ACK/NACK transmission, respectively, at each corresponding time.

28. A method for data transmission in a communication system, the method comprising:

receiving modulated data mapped to a first resource at a first time, the first time based on a function of a first time index; and receiving modulated data mapped to a second resource at a [first] *second* time, the second time based on the first time index and a second time index, wherein the first resource and the second resource are at least one of an orthogonal code *defined on a per slot level based on a slot index* and a cyclic shift of a base *defined on a per symbol level based on a symbol index and defined a slot level based on a slot index*, wherein each of the first time and second time is defined on at least one of a symbol level and a slot level, and wherein a slot consists of at least one symbol.

29. The method of claim 28, wherein when the received data is acknowledgement and negative acknowledgement (ACK/NACK) data, the resource is an orthogonal code and a cyclic shift of a base.

30. The method of claim 28, wherein when the received data is Channel Quality Indicator (CQI) data, the resource is a cyclic shift of a base.

[31. The method of claim 28, wherein the cyclic shift of a base is defined on a per symbol level or a slot level based on a symbol index or a slot index, respectively.]

[32. The method of claim 28, wherein the orthogonal code is defined on a per slot level based on a slot index.]

33. The method of claim 28, wherein the modulated data is mapped using symbol wise spreading with the orthogonal code.

34. The method of claim 28, wherein the first resource used in the first time and the second resource used in the second time are selected based upon an amount of a total resource associated with a corresponding time index.

35. The method of claim 28, wherein when a total resource is shared by CQI transmission and ACK/NACK transmission, the total resource is separated into a portion for CQI transmission and a portion for ACK/NACK transmission.

36. The method of claim 35, wherein resource for CQI transmission and resource for ACK/NACK transmission are selected among the portion for CQI transmission and the portion for ACK/NACK transmission, respectively, at each corresponding time.

*37. An apparatus for communication in a mobile communication system, comprising:*

*transmitter signal processing circuitry configured to:*

*acquire an orthogonal sequence for an acknowledgement or negative acknowledgement (ACK/NAK) signal based on a slot index and a cyclic shift of a base sequence for the ACK/NAK signal, wherein the cyclic shift of the base sequence for the ACK/NAK signal is based on a symbol index, a slot index and a cell identification;*

*acquire an orthogonal sequence for a reference signal based on a slot index and a cyclic shift of a base sequence for the reference signal, wherein the cyclic shift of the base sequence for the reference signal is based on a symbol index, a slot index and a cell identification;*

*obtain the ACK/NAK signal based on the orthogonal sequence and the cyclic shift for the ACK/NAK signal at a corresponding symbol and a corresponding slot; and*

*obtain the reference signal based on the orthogonal sequence and the cyclic shift for the reference signal at a corresponding symbol and a corresponding slot; and*

*a transmitter coupled to the transmitter signal processing circuitry and configured to transmit the ACK/NAK signal and the reference signal.*

*38. The apparatus of claim 37, wherein the orthogonal sequence and the cyclic shift for the ACK/NAK signal in a second slot are further derived based on a first slot index.*

*39. The apparatus of claim 37, wherein the orthogonal sequence and the cyclic shift for the reference signal in a second slot are further derived based on a first slot index.*

*40. The apparatus of claim 37, wherein a number of cyclic shift for the ACK/NAK signal in a mixed channel quality indication (CQI) and ACK/NAK resource block (RB) are configured.*

*41. The apparatus of claim 37, wherein the base sequence is a Zadoff-Chu sequence.*

*42. A method for communication in a mobile communication system, the method comprising:*

*acquiring an orthogonal sequence for a acknowledgement and negative acknowledgement (ACK/NAK) signal based on a slot index and a cyclic shift of a base sequence for the ACK/NAK signal, wherein the cyclic shift of the base sequence for the ACK/NAK signal is based on a symbol index, a slot index and a cell identification;*

*acquiring an orthogonal sequence for a reference signal based on a slot index and a cyclic shift of a base sequence for the reference signal, wherein the cyclic shift of the base sequence for the reference signal is based on a symbol index, a slot index and a cell identification;*

*obtaining the ACK/NAK signal based on the orthogonal sequence and the cyclic shift for the ACK/NAK signal at a corresponding symbol and a corresponding slot;*

*obtaining the reference signal based on the orthogonal sequence and the cyclic shift for the reference signal at a corresponding symbol and a corresponding slot; and*

*transmitting the ACK/NAK signal and the reference signal.*

*43. The method of claim 42, wherein the orthogonal sequence and the cyclic shift for the ACK/NAK signal in a second slot are further derived based on a first slot index.*

*44. The method of claim 42, wherein the orthogonal sequence and the cyclic shift for the reference signal in a second slot are further derived based on a first slot index.*

*45. The method of claim 42, wherein a number of cyclic shift for the ACK/NAK signal in a mixed channel quality indication (CQI) and ACK/NAK resource block (RB) is configured.*

*46. The method of claim 42, wherein the base sequence is a Zadoff-Chu sequence.*

*47. An apparatus for communication in a mobile communication system, comprising:*

*a receiver configured to receive a signal; and*

*receiver signal processing circuitry coupled to the receiver and configured to:*

*acquire an orthogonal sequence for a acknowledgement or negative acknowledgement (ACK/NAK) signal responsive to the received signal based on a slot index and a cyclic shift of a base sequence for the ACK/NAK signal, wherein the cyclic shift of the base sequence for the ACK/NAK signal is based on a symbol index, a slot index and a cell identification;*

*acquire an orthogonal sequence for a reference signal based on a slot index and a cyclic shift of a base sequence for the reference signal, wherein the cyclic shift of the base sequence for the reference signal is based on a symbol index, a slot index and a cell identification;*

*obtain ACK/NAK based on the received signal, the orthogonal sequence and the cyclic shift for the ACK/NAK signal at a corresponding symbol and a corresponding slot; and*

*obtain the reference signal based on the orthogonal sequence and the cyclic shift for the reference signal at a corresponding symbol and a corresponding slot.*

*48. The apparatus of claim 47, wherein the orthogonal sequence and the cyclic shift for the ACK/NAK signal in a second slot are further derived based on a first slot index.*

*49. The apparatus of claim 47, wherein the orthogonal sequence and the cyclic shift for the reference signal in a second slot are further derived based on a first slot index.*

*50. The apparatus of claim 47, wherein a number of cyclic shift for the ACK/NAK signal in a mixed channel quality indication (CQI) and ACK/NAK resource block (RB) is configured.*

*51. The apparatus of claim 47, wherein the base sequence is a Zadoff-Chu sequence.*

*52. A method for communication in a mobile communication system, comprising:*

*receiving a signal;*

*acquiring an orthogonal sequence for an acknowledgement or negative acknowledgement (ACK/NAK) signal based on a slot index and a cyclic shift of a base sequence for the ACK/NAK signal, wherein the cyclic shift of the base sequence for the ACK/NAK signal is based on a symbol index, a slot index and a cell identification;*

*acquiring an orthogonal sequence for a reference signal based on a slot index and a cyclic shift of a base sequence for the reference signal, wherein the cyclic shift of the base sequence for the reference signal is based on a symbol index, a slot index and a cell identification;*

*obtaining ACK/NAK based on the received signal, the orthogonal sequence and the cyclic shift for the ACK/NAK signal at a corresponding symbol and a corresponding slot; and*

*obtaining the reference signal based on the orthogonal sequence and the cyclic shift for the reference signal at a corresponding symbol and a corresponding slot.*

*53. The method of claim 52, wherein the orthogonal sequence and the cyclic shift for the ACK/NAK signal in a second slot are further derived based on a first slot index.*

*54. The method of claim 52, wherein the orthogonal sequence and the cyclic shift for the reference signal in a second slot are further derived based on a first slot index.*

*55. The method of claim 52, wherein a number of cyclic shift for the ACK/NAK signal in a mixed channel quality indication (CQI) and ACK/NAK resource block (RB) is configured.*

*56. The method of claim 52, wherein the base sequence is a Zadoff-Chu sequence.*

* * * * *